United States Patent
Said et al.

(10) Patent No.: US 10,499,074 B2
(45) Date of Patent: Dec. 3, 2019

(54) BINARY ARITHMETIC CODING WITH SMALL TABLES OR SHORT-OPERAND MULTIPLICATIONS FOR VIDEO CODING

(71) Applicant: QUALCOMM Incorporated, San Diego, CA (US)

(72) Inventors: Amir Said, San Diego, CA (US); Cheng-Teh Hsieh, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 31 days.

(21) Appl. No.: 15/864,901

(22) Filed: Jan. 8, 2018

(65) Prior Publication Data

US 2018/0199048 A1    Jul. 12, 2018

Related U.S. Application Data

(60) Provisional application No. 62/444,308, filed on Jan. 9, 2017.

(51) Int. Cl.
*H04N 19/00* (2014.01)
*H04N 19/44* (2014.01)
(Continued)

(52) U.S. Cl.
CPC .......... *H04N 19/44* (2014.11); *H04N 19/13* (2014.11); *H04N 19/42* (2014.11); *H04N 19/50* (2014.11); *H04N 19/70* (2014.11)

(58) Field of Classification Search
CPC ........ H04N 19/13; H04N 19/42; H04N 19/50; H04N 19/70; H04N 19/44
See application file for complete search history.

(56) References Cited

U.S. PATENT DOCUMENTS

| | | |
|---|---|---|
| 4,122,440 A | 10/1978 | Langdon, Jr. et al. |
| 4,286,256 A | 8/1981 | Langdon, Jr. et al. |

(Continued)

FOREIGN PATENT DOCUMENTS

WO    2016184399 A1    11/2016

OTHER PUBLICATIONS

Zhou et al. "On JEM Binary Arithmetic Engine Design". Accessed Jan. 4, 2017. (Year: 2017).*

(Continued)

*Primary Examiner* — Zhihan Zhou
(74) *Attorney, Agent, or Firm* — Shumaker & Sieffert, P.A.

(57) ABSTRACT

A method of decoding video data including receiving video data including coded representations of syntax elements performing inverse binary arithmetic coding on the coded representations of the syntax elements to obtain bins of the syntax elements, inverse binarizing the bins of the syntax elements to obtain the syntax elements, and decoding the video data based on the syntax elements. Performing the inverse binary arithmetic coding includes determining a probability for a particular coded representation of the coded representations, normalizing the probability for the particular coded representation using right bit shifts to create a normalized probability, determining a product of the normalized probability and a range for the particular coded representation, and updating a range of a least probable symbol for the particular coded representation using the determined product.

27 Claims, 13 Drawing Sheets

(51) Int. Cl.
*H04N 19/70* (2014.01)
*H04N 19/50* (2014.01)
*H04N 19/13* (2014.01)
*H04N 19/42* (2014.01)

(56) References Cited

U.S. PATENT DOCUMENTS

| | | | |
|---|---|---|---|
| 4,467,317 A | 8/1984 | Langdon, Jr. et al. | |
| 4,652,856 A | 3/1987 | Mohiuddin et al. | |
| 4,891,643 A | 1/1990 | Mitchell et al. | |
| 4,905,297 A | 2/1990 | Langdon, Jr. et al. | |
| 4,933,883 A | 6/1990 | Pennebaker et al. | |
| 4,935,882 A | 6/1990 | Pennebaker et al. | |
| 4,989,000 A | 1/1991 | Chevion et al. | |
| 5,099,440 A | 3/1992 | Pennebaker et al. | |
| 5,272,478 A | 12/1993 | Allen | |
| 2013/0107951 A1* | 5/2013 | Sole Rojals | H04N 19/13 375/240.12 |
| 2018/0139445 A1* | 5/2018 | Chuang | H04N 19/91 |

OTHER PUBLICATIONS

Chen et al. "Algorithm Description of Joint Exploration Test Model 4". (Year: 2016).*
Rosewarne et al. "High Efficiency Video Coding (HEVC) Test Model 16 (HM 16) Improved Encoder Description Update 4". (Year: 2016).*
"Arithmetic coding," Wikipedia, accessed from https://en.wikipedia.org/wiki/Arithmetic_coding, 15 pp.
Said et al., "Binary arithmetic coding with small table or short multiplications," Jan. 12-20, 2017 (Joint Video Exploration Team (JVET) of ITU-T SG 16 WP 3 and ISO/IEC JTC 1/SC 29/WG 11) document No. JVET-E0119, Jan. 12, 2017, 4 pp.
Said, "Introduction to Arithmetic Coding—Theory and Practice," Hewlett Packard Laboratories, Technical Report HPL-2004-76, Apr. 2006, 67 pp.
Marpe et al., "Context-Based Adaptive Binary Arithmetic Coding in the H.264/AVC Video Compression Standard," IEEE Trans. Circuits Syst. Video. Technol., vol. 13, No. 7, Jul. 2003, pp. 620-636.
Richardson, "The H.264 Advanced Video Compression Standard," 2nd ed. John Wiley and Sons Ltd., 2010, 306 pp.
Sze et al., "High Throughput CABAC Entropy Coding in HEVC," IEEE Trans. Circuits Syst. Video Technol., vol. 22, No. 12, Dec. 2012, pp. 1778-1791.
Wien M., "High Efficiency Video Coding," Coding Tools and Specification, Springer-Verlag, Berlin, Sep. 2015, 30 pp.
Mukherjee et al. "The latest open-source video codec VP9—an overview and preliminary results," in Proc. 30th Picture Coding Symp., San Jose, CA, Dec. 2013.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Mukherjee, et al., "The latest open-source video codec VP9—An overview and preliminary results," IEEE 2013, Feb. 2013, pp. 390-393.
Alshin, et al., "High precision probability estimation for CABAC," In Proc. IEEE Visual Commun. Image Process, Conf. Kuching, Malyasia, Nov. 2013, 6 pp.
Suehring, K., et al., "JVET common test conditions and software reference configurations", Joint Video Exploration Team (JVET) of ITU-T SG16 WP3 and ISO/IEC JTC1/SC29/WG11 2nd Meeting: San Diego, USA Feb. 20-26, 2017, JVET-B1010, Apr. 4, 2016, 4 pp.
Chen J., et al., "Algorithm Description of Joint Exploration Test Model 4", 4. JVET Meeting; Oct. 15, 2016-Oct. 21, 2016; Chengdu; (The Joint Video Exploration Team of ISO/IEC JTC1/SC29/WG11 and ITUT SG.16); URL: http://phenix.int-evry.fr/jvet/, No. JVET-D1001, Oct. 28, 2016 (Oct. 28, 2016), 38 Pages, XP030150460.
International Search Report and Written Opinion of International Application No. PCT/US2018/012926, dated Jun. 19, 2018, 17 PP.
Rosewarne C., et al., "High Efficiency Video Coding (HEVC) Test Model 16 (HM 16) Improved Encoder Description Update 4", 22nd Meeting, Oct. 15 through 21, 2015, Joint Collaborative Team on Video Coding (JCT-VC) of ITUSG16 and ISO/IEC JTC1/SC29/WG11, JCTVC-V1002, Oct. 2015, 62 pp.
Zhou M., et al., "On JEM Binary Arithmetic Engine Design," 5. JVET Meeting; Jan. 12, 2017-Jan. 20, 2017; Geneva, CH (The Joint Video Exploration Team of ISO/IEC JTC1/SC29/WG11 and ITU-T SG.16), No. JVET-E0064, Jan. 4, 2017 (Jan. 4, 2017), XP030150545, 6 pages, URL: http://phenix.int-evry.fr/jvet/.

* cited by examiner

BINARY ARITHMETIC CODING WITH SMALL TABLES OR SHORT-OPERAND MULTIPLICATIONS FOR VIDEO CODING

This application claims the benefit of U.S. Provisional Application No. 62/444,308 filed Jan. 9, 2017, the entire content of which is incorporated by reference herein.

TECHNICAL FIELD

This disclosure relates to video coding and, more particularly, to techniques for binary arithmetic coding of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

Various entropy coding processes may be used to code residual transform coefficients, motion vector information, syntax elements, and other associated information. Examples of various entropy coding and other data compression processes include context-adaptive variable length coding (CAVLC), context-adaptive binary arithmetic coding (CABAC), probability interval partitioning entropy coding (PIPE), Golomb coding, Golomb-Rice coding, and exponential Golomb coding.

SUMMARY

In general, this disclosure describes techniques for binary arithmetic coding in video coding, and video encoders and decoders for performing such techniques. In some examples, the techniques of this disclosure may support binary arithmetic coding with the same or similar level of compression as other techniques, but with less complexity. Example techniques of this disclosure may include determining an arithmetic coding interval (e.g., a range of a least probable symbol) using a normalized and/or scaled value of a probability. The normalized and/or scaled value of the probability may be used to determine a product, e.g., using a look-up table or a multiplication operation performed by circuitry.

In one example of the disclosure, a method of decoding video data comprises receiving video data including coded representations of syntax elements, performing inverse binary arithmetic coding on the coded representations of the syntax elements to obtain bins of the syntax elements, performing the inverse binary arithmetic coding including determining a probability for a particular coded representation of the coded representations, normalizing the probability for the particular coded representation using right bit shifts to create a normalized probability, determining a product of the normalized probability and a range for the particular coded representation, and updating a range of a least probable symbol for the particular coded representation using the determined product, inverse binarizing the bins of the syntax elements to obtain the syntax elements, and decoding the video data based on the syntax elements.

In another example, this disclosure describes an apparatus configured to decode video data, the apparatus comprising a memory configured to store the video data, and one or more processors in communication with the memory, the one or more processors configured to receive the video data including coded representations of syntax elements, perform inverse binary arithmetic coding on the coded representations of the syntax elements to obtain bins of the syntax elements, wherein to perform the inverse binary arithmetic coding, the one or more processors are further configured to determine a probability for a particular coded representation of the coded representations, normalize the probability for the particular coded representation using right bit shifts to create a normalized probability, determine a product of the normalized probability and a range for the particular coded representation, update a range of a least probable symbol for the particular coded representation using the determined product, inverse binarize the bins of the syntax elements to obtain the syntax elements, and decode the video data based on the syntax elements.

In another example, this disclosure describes an computer-readable-storage medium storing instructions that, when executed, causes one or more processors of a device configured to decode video data to receive the video data including coded representations of syntax elements, perform inverse binary arithmetic coding on the coded representations of the syntax elements to obtain bins of the syntax elements, wherein to perform the inverse binary arithmetic coding, the one or more processors are further configured to determine a probability for a particular coded representation of the coded representations, normalize the probability for the particular coded representation using right bit shifts to create a normalized probability, determine a product of the normalized probability and a range for the particular coded representation, and update a range of a least probable symbol for the particular coded representation using the determined product, inverse binarize the bins of the syntax elements to obtain the syntax elements, and decode the video data based on the syntax elements.

In another example, this disclosure describes an apparatus configured to encode video data, the apparatus comprising a memory configured to store the video data, and one or more processors in communication with the memory, the one or more processors configured to encode the video data to produce syntax elements, binarize the syntax elements into bins, perform binary arithmetic coding on the bins of the syntax elements to produced coded representations of the bins, wherein to perform the binary arithmetic coding, the one or more processors are further configured to determine a probability for a particular bin of a particular syntax element of the syntax elements, normalize the probability for the particular bin using right bit shifts to create a normalized probability, determine a product of the normalized probability and a range for the particular bin, and update a range of a least probable symbol for the particular bin using the determined product, and signal the coded representations in a bitstream.

The details of one or more examples are set forth in the accompanying drawings and the description below. Other features, objects, and advantages will be apparent from the description and drawings, and from the claims.

DETAILED DESCRIPTION

This disclosure describes techniques for binary arithmetic coding (BAC). In some examples, the techniques of this disclosure may be used in a context adaptive binary arithmetic coding (CABAC) process during video coding. For example, such techniques may be performed in video encoders and video decoders configured to perform such techniques. The coding (i.e., encoding or decoding) techniques described in this disclosure also may be applicable to other types of data coding. Video coding will be described for purposes of illustration in this disclosure.

In some example video coding systems, the time it takes to implement BAC may be a bottleneck in both the encoding and decoding processes. For example, performing BAC on video syntax elements may take a large percentage of the time spent decoding a block of video data. If BAC takes too long, frame rate may suffer. This disclosure describes techniques that may reduce the complexity of implementing some BAC processes, and may reduce the time needed to perform BAC.

Figure 1:
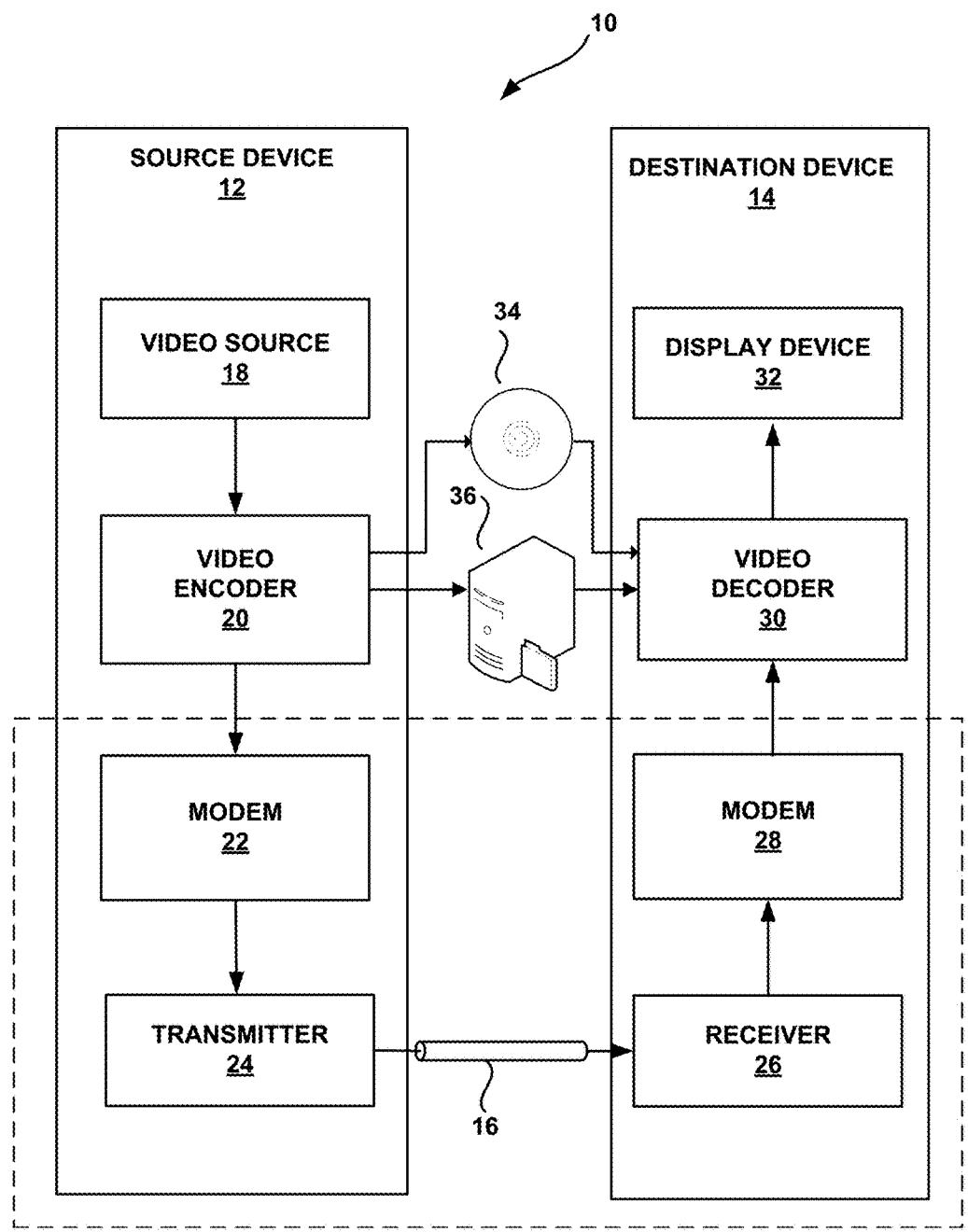
FIG. 1 is a block diagram illustrating an example video encoding and decoding system.

FIG. 1 is a block diagram illustrating an example video encoding and decoding system 10 that may be configured to utilize techniques for BAC in a video coding process in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD DVD, or Blu-ray reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for BAC in a video coding process, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or applications in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on storage medium 34 may then be accessed by destination device 14 for decoding and playback.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, optical fiber, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the HEVC standard, or any future standard. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263. For example, video encoder 22 and video decoder 30 may be configured to operate according to other video coding techniques and/or standards, including new video coding techniques being explored by the Joint Video Exploration Team (WET). The Joint Exploratory Model (JEM) is the test model used by the JVET for studying video coding techniques.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, including fixed-function and/or programmable processing circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for BAC in a video coding process. Likewise, video decoder 30 may implement any or all of these techniques BAC in a video coding process. A video coder, as described in this disclosure, may refer to a video encoder or a video decoder. Similarly, a video coding unit may refer to a video encoder or a video decoder. In this context, a video coding unit is physical hardware and differs from the CU data structure discussed above. Likewise, video coding may refer to video encoding or video decoding.

As will be discussed in more detail below, in one example of the disclosure, video decoder 30 may be configured to receive video data including coded representations of syntax elements, perform inverse binary arithmetic coding on the coded representations of the syntax elements to obtain bins of the syntax elements, inverse binarize the bins of the syntax elements to obtain the syntax elements, and decode the video data based on the syntax elements. To perform the inverse binary arithmetic coding, video decoder 30 may be further configured to determine a probability for a particular coded representation of the coded representations, normalize the probability for the particular coded representation using right bit shifts to create a normalized probability, determine a product of the normalized probability and a range for the particular coded representation, and update a range of a least probable symbol for the particular coded representation using the determined product.

Likewise, video encoder 20 may be configured to encode the video data to produce syntax elements, binarize the syntax elements into bins, perform binary arithmetic coding on the bins of the syntax elements to produced coded representations of the bins, and signal the coded representations in a bitstream. To perform the binary arithmetic coding, video encoder 20 may be further configured to determine a probability for a particular bin of a particular syntax element of the syntax elements, normalize the probability for the particular bin using right bit shifts to create a normalized probability, determine a product of the normalized probability and a range for the particular bin, and update a range of a least probable symbol for the particular bin using the determined product.

Digital video devices implement video compression techniques, such as those performed by video encoder 20 and video decoder 30, to encode and decode digital video information more efficiently. Video compression may apply spatial (intra-frame) prediction and/or temporal (inter-frame) prediction techniques to reduce or remove redundancy inherent in video sequences.

For video coding according to the High-Efficiency Video Coding (HEVC or ITU-T H.265) standard, as one example, a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as Cr and Cb. Depending on the video sampling format, the size of the Cr and Cb components, in terms of number of samples, may be the same as or different from the size of the Y component. A CU is typically square, and may be considered to be similar to a so-called macroblock, e.g., under other video coding standards such as ITU-T H.264.

The luma and chroma components of pixels in a CU may be coded in different sub-sampling formats. In one proposal for HEVC, the luma and chroma components of a pixel are coded in a 4:2:0 format. In a 4:2:0 pixel format, for every 4×2 block of pixels, there are eight luma components (4 in each row) and 2 chroma components (e.g., 1 Cr chroma component and 1 Cb chroma component in the first row of the 4×2 block). The second row of the 4×2 block would have no chroma information. As such, in a 4×2 block of pixels, the chroma components are sampled at ½ horizontal resolution and ½ vertical resolution. However, video coding techniques are not limited to 4:2:0 chroma sub-sampling. Other sub-sampling formats may be used, including 4:2:2 and 4:4:4. In a 4:2:2 pixel format, for every 4×2 block of pixels, there are eight luma components (4 in each row) and 4 chroma components (e.g., 1 Cr chroma component and 1 Cb chroma component in each of the first and second row of the 4×2 block). As such, for a 4:2:2 format, the chroma components are sampled at ½ horizontal resolution and full vertical resolution. The 4:4:4 pixel format involves no sub-sampling of chroma components. That is, for a 4×2 block of pixels, there are eight luma components, eight Cr components, and eight Cb components. These or other sampling formats could be used.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). PUs may be considered to be similar to so-called partitions under other video coding standards, such as H.264. TUs refer to blocks of residual data to which a transform is applied to produce transform coefficients.

Coding according to some of aspects of the HEVC standard will be described in this application for purposes of illustration. However, the techniques described in this disclosure may be useful for other video coding processes, such as those defined according to H.264 or other standard or proprietary video coding processes.

HEVC standardization efforts were based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

According to the HM, a CU may include one or more prediction units (PUs) and/or one or more transform units (TUs). Syntax data within a bitstream may define a largest coding unit (LCU) or coding tree block (CTB), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded. For intra coding, a PU may be treated the same as a leaf transform unit described below.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same frame, and other prediction units may be inter-coded (P or B) with respect to reference blocks in other frames. The reference blocks used for prediction may include actual pixel values at so-called integer pixel positions as reference samples, or synthesized pixel values produced by interpolation at fractional pixel positions as reference samples.

Upon identification of a predictor, the difference between the original video data block and its predictor is calculated. This difference is also called the prediction residual, and refers to the pixel differences between the pixels of the block to be coded and corresponding reference samples (which may be integer-precision pixels or interpolated fractional-precision pixels, as mentioned above) of the reference block, i.e., predictor. To achieve better compression, the prediction residual (i.e., the array of pixel difference values) is generally transformed from the pixel (i.e., spatial) domain to a transform domain, e.g., using a discrete cosine transform (DCT), integer transform, Karhunen-Loeve (K-L) transform, wavelet transform, or other transform. The transform domain may be, for example, a frequency domain.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may be interpolated, in whole or in part, and occur at a fractional pixel position. Upon finding a portion of the reference frame that best matches the current portion, the encoder determines the current motion vector for the current portion as the difference in the location from the current portion to the matching portion in the reference frame (e.g., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data because the resulting transform coefficients represent different frequencies, wherein the majority of energy is usually concentrated on a few low frequency coefficients.

Typically, the resulting transform coefficients are grouped together in a manner that enables entropy coding, especially if the transform coefficients are first quantized (rounded). The encoder then performs statistical lossless (or so-called "entropy") encoding to further compress the run-length coded quantized transform coefficients. After performing lossless entropy coding, the encoder generates a bitstream that includes the encoded video data. Examples of entropy coding includes CABAC, context adaptive variable length coding (CAVLC), probability interval partitioning entropy coding (PIPE), Golomb coding, Golomb-Rice coding, exponential Golomb coding, syntax-based context-adaptive binary arithmetic coding (SBAC), or other entropy coding methodologies.

The following section will describe BAC and CABAC techniques in more detail. BAC, in general, is a recursive interval-subdividing procedure. BAC is used to encode bins of syntax elements in the CABAC process in the H.264/AVC video coding standard, and in the HEVC video coding standard. Likewise, on the decoder side, CABAC may be used to decode the coded representations of the bins and retrieve the bin values. The syntax elements that may be coded using a CABAC process may be any data structures that represent video data or how the video data is coded, including syntax elements representing coding modes, motion vectors, transform coefficients representative of residual values, etc. The output of the BAC coder is a binary stream (e.g., coded representations of bins of syntax elements) that represents an interval value or pointer to a probability within a final coded probability interval. In some examples, the probability interval (also called an arithmetic coding interval or interval range) is specified by a range and a lower end value. Range is the extent of the probability interval. Low is the lower bound of the coding interval. Both video encoder 20 and video decoder 30 are configured to determine and update the interval range. Video decoder 30 may receive the coded representations and perform an inverse BAC process to recover the bin values of the syntax elements. The coded representations are the interval values that video decoder 30, based on the updated interval ranges, uses to determine the bin values of a syntax element Application of arithmetic coding to video coding is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003, which is incorporated by reference herein. Each context (i.e., probability model) in CABAC is represented by a state. Each state ($\sigma$) implicitly represents a probability ($p_\sigma$) of a particular symbol (e.g., a bin of a binarized syntax element) being the Least Probable Symbol (LPS). A symbol can be an LPS or a Most Probable Symbol (MPS). Symbols are binary, and as such, the MPS and the LPS can be 0 or 1. The probability is estimated for the corresponding context and used (implicitly) to entropy code the symbol using the arithmetic coder.

In some examples, the BAC process is performed by a state machine that changes the internal values 'range' and 'low' depending on the context to code and the value of the bin being coded. Depending on the state of a context (that is, its probability), the range is divided into rangeMPS$_\sigma$ (range of the most probable symbol in state$_\sigma$) and rangeLPS$_\sigma$ (range of the least probable symbol in state,). In theory, the rangeLPS$_\sigma$ value of a probability state, is derived by a multiplication:

$$\text{rangeLPS}_\sigma = \text{range} \times p_\sigma,$$

where $p_\sigma$ is the probability to select the LPS. In some examples, the multiplication to determine rangeLPS$_\sigma$ may be performed directly by video encoder 20 and video decoder 30. In other examples, video encoder 20 and video decoder 30 may store a table of computed multiplications. Video encoder 20 and video decoder 30 may use indexes to the table (the indexes based on possible values of range and p$_\sigma$) to determine the value of rangeLPS$_\sigma$. Of course, the probability of MPS is 1-p$_\sigma$. Equivalently, the rangeMPS$_\sigma$ is equal to range minus rangeLPS$_\sigma$. BAC iteratively updates the range depending on the state of the context bin to code, the current range, and the value of the bin being coded (i.e., based on whether the bin equal to the LPS or the MPS).

Figure 2A:
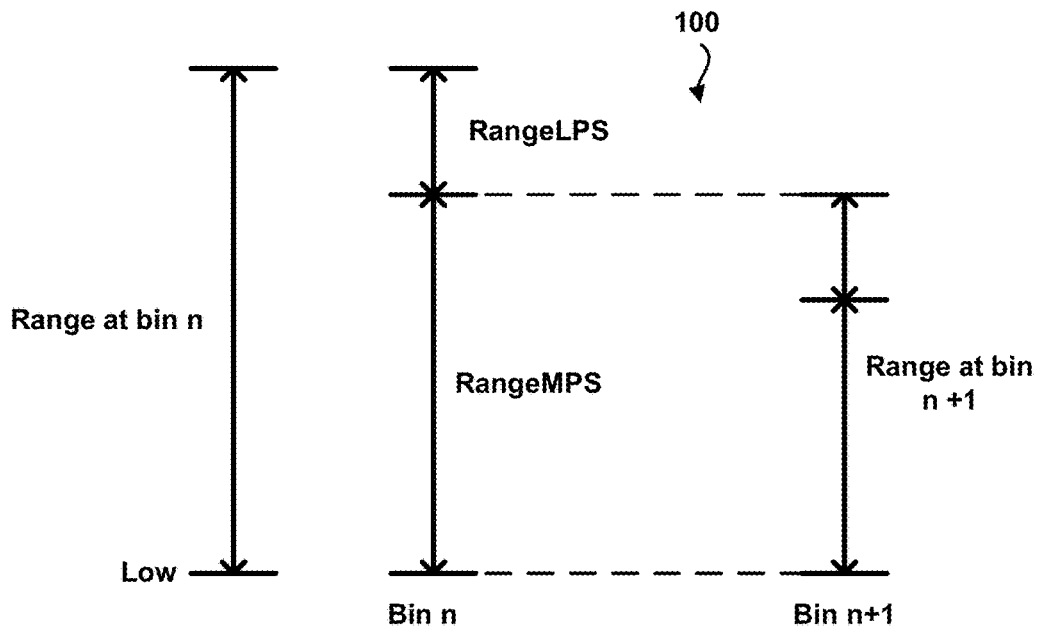
FIGS. 2A and 2B are conceptual diagrams illustrating a range update process in binary arithmetic coding.
Figure 2B:
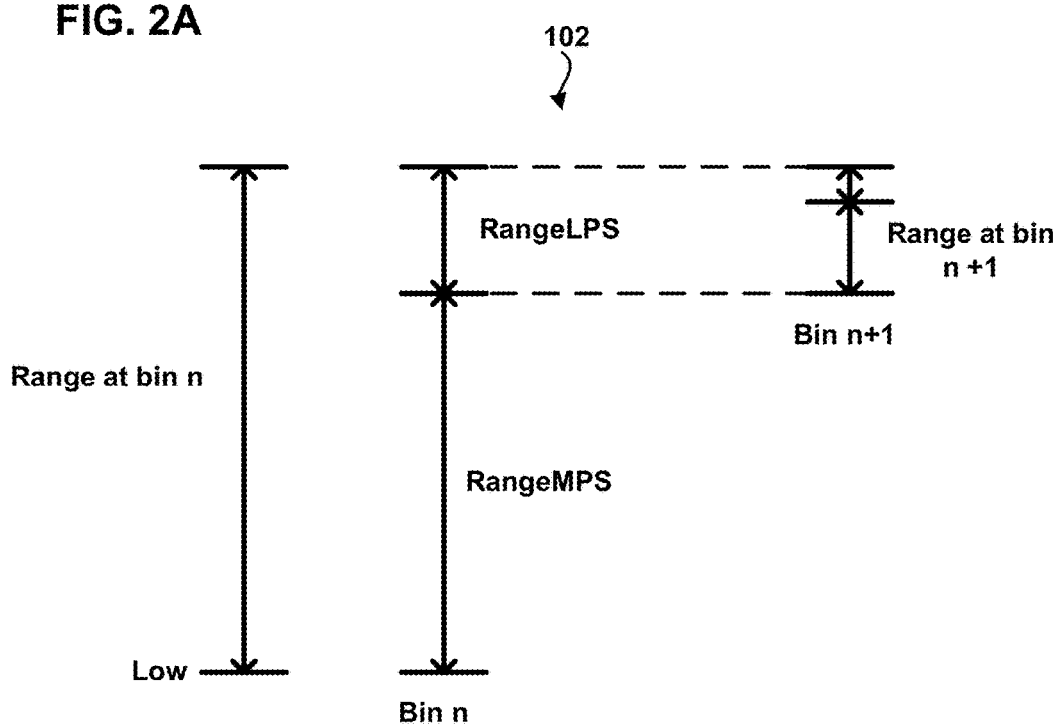

FIGS. 2A and 2B shows examples of this process at bin n. This process may be performed by both video encoder 20 and video decoder 30. In example 100 of FIG. 2A, the range at bin N includes the RangeMPS and RangeLPS given by the probability of the LPS (p$_\sigma$) given a certain context state ($\sigma$). Example 100 shows the update of the range at bin n+1 when the value of bin n is equal to the MPS. In this example, the low stays the same, but the value of the range at bin n+1 is reduced to the value of RangeMPS at bin n. Example 102 of FIG. 2B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

In one example, the range is expressed with 9 bits and the low with 10 bits. In some examples, video encoder 20 and video decoder 30 may be configured to perform a renormalization process to maintain the range and low values at some predetermined level of precision. In one example, video encoder 20 and video decoder 30 may perform the renormalization whenever the range is less than 256. Therefore, in this example, the range is always equal or larger than 256 after renormalization. Depending on the values of range and low, the BAC process outputs to the bitstream, a '0,' or a '1,' or updates an internal variable (called BO: bits-outstanding) to keep for future outputs.

Figure 3:
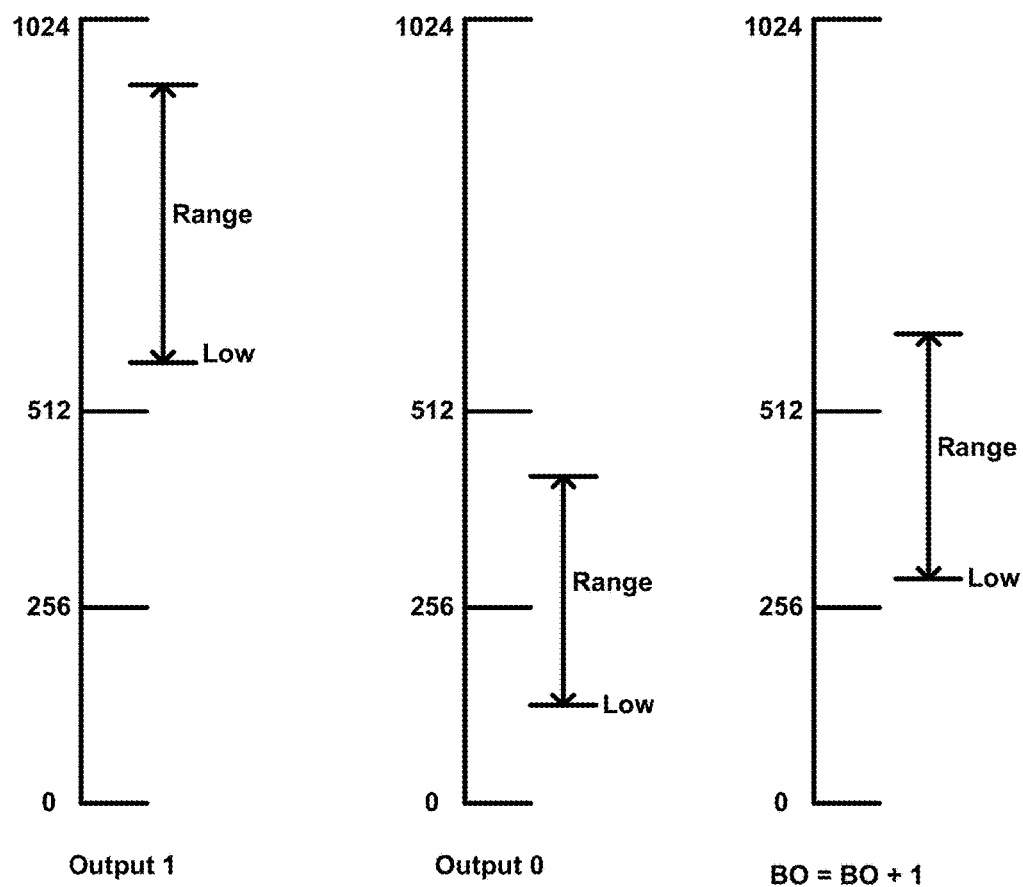
FIG. 3 is a conceptual diagram illustrating an output process in binary arithmetic coding.

FIG. 3 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of H.264/AVC and in some proposals for HEVC, there are 128 states. There are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the state can be indexed with 7 bits.

In some examples, to reduce the computation of deriving LPS ranges (rangeLPS$_\sigma$), results for all cases are pre-calculated and stored as approximations in a look-up table in H.264/AVC and in some proposals for HEVC. Therefore, the LPS range (rangeLPS$_\sigma$) can be obtained without any multiplication by using a simple table lookup. Avoiding multiplication can be important for some devices or applications, since this operation may cause significant latency in many hardware architectures.

In one example, a 4-column pre-calculated LPS range table is used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

| Range Index | | | | |
|---|---|---|---|---|
| | Range | | | |
| | 256-319 | 320-383 | 384-447 | 448-511 |
| (range >> 6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2

| | RangeLPS | | | |
|---|---|---|---|---|
| | | RangeLPS | | |
| Prob State ($\sigma$) | Index 0 | Index 1 | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state, is pre-defined. In other words, the LPS range of a probability state, is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability for each state is derived as follows:

$$p_\sigma = \alpha p_{\sigma-1}$$

where the state $\sigma$ is from 0 to 63. The constant $\alpha$ represents the amount of probability change between each context state. In one example, $\alpha=0.9493$, or, more precisely, $\alpha=(0.01875/0.5)^{1/63}$. The probability at state $\sigma=0$ is equal to 0.5 (i.e., $p_0=\frac{1}{2}$). That is, at context state 0, the LPS and MPS are equally probable. The probability at each successive state is derived by multiplying the previous state by $\alpha$. As such, the probability of the LPS occurring at context state $\alpha=1$ is $p_0*0.9493$ ($0.5*0.9493=0.47465$). As the index of state $\alpha$ increases, the probability of the LPS occurring goes down.

CABAC is adaptive because the probability states are updated in order to follow signal statistics (e.g., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index is simply incremented by 1. This is performed for all states, except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of an LPS, with the following exception. Assuming a LPS has been encoded at the state with index $\sigma=0$, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability $p_{old}$ and its updated counterpart $p_{new}$:

$$p_{new} = \max(\alpha p_{old}, p_{62}) \text{ if a MPS occurs}$$

$$p_{new} = (1-\alpha) + \alpha p_{old} \text{ if a LPS occurs}$$

In one example practical implementation of the probability estimation process in CABAC, transition rules may be realized by at most two tables each having 63 entries of 6-bit unsigned integer values. In some examples, state transitions may be determined with a single table TransIdxLPS, which determines, for a given state index a, the new updated state index TransIdxLPS [σ] in case an LPS has been observed. The MPS-driven transitions can be obtained by a simple (saturated) increment of the state index by the fixed value of 1, resulting in an updated state index min(σ+1, 62). Table 3 below is an example of a partial TransIdxLPS table.

TABLE 3

| TransIdxLPS | |
|---|---|
| Prob State (σ) | New State TransIdxLPS [σ] |
| ... | ... |
| 9 | 6 |
| 10 | 8 |
| 11 | 8 |
| 12 | 8 |
| ... | ... |

As discussed above, BAC is a fundamental entropy coding tool used in the video compression standard AVC/H.264, and the only entropy coding technique of HEVC/H.265 and VP9. BAC is expected to remain as the only entropy coding technique of future standards. Further discussion of BAC may be found in A. Said, "Arithmetic Coding," in Lossless Compression Handbook, K. Sayood, Ed., Academic Press, ch. 5, pp. 101-152, 2003, A. Said, "Introduction to arithmetic coding—theory and practice," Hewlett Packard Laboratories, Palo Alto, Calif., USA, Technical Report HPL-2004-76, April 2004, (http://www.hpl.hp.com/techreports/2004/HPL-2004-76.pdf), I. D. Marpe, H. Schwarz, and T. Wiegand, "Context-based adaptive binary arithmetic coding in the H.264/AVC video compression standard," *IEEE Trans. Circuits Syst. Video Technol.*, vol. 13, no. 7, pp. 620-636, July 2003, I. E. Richardson, *The H.264 Advanced Video Compression Standard*, $2^{nd}$ ed., John Wiley and Sons Ltd., 2010, V. Sze and M. Budagavi, "High throughput CABAC entropy coding in HEVC," *IEEE Trans. Circuits Syst. Video Technol.*, vol. 22, no. 12, pp. 1778-1791, December 2012, M. Wien, *High Efficiency Video Coding: Coding Tools and Specification*, Springer-Verlag, 2015, and D. Mukherjee, J. Bankoski, R. S. Bultje, A. Grange, J. Han, J. Koleszar, P. Wilkins, and Y. Xu, "The latest open-source video codec VP9—an overview and preliminary results," in *Proc. 30th Picture Coding Symp.*, San Jose, Calif., December 2013.

Since the arithmetic decoder may be important in defining the throughput of a video decoder (e.g., in compressed bits per second), it may be beneficial for the arithmetic coder of video decoder 30 to have low computational complexity, measured by hardware decoder implementations. That is, the throughput of video decoder 30 may be directly affected by the throughput of the arithmetic coder in video decoder 30. It may also be beneficial for video encoder 20 to have a low complexity implementation of an arithmetic encoder. Thus, when encoding and decoding individual bins (binary symbols), even a single multiplication can be too expensive, and instead table-look-up methods have been employed.

Unlike CABAC in H.265, the arithmetic coding implementations in some examples of JEM use higher accuracy (e.g., 15 bits) for representing probabilities, and for updating the estimated values of probabilities. For interval range updating (e.g., computing RangeLPS) the JEM-4.0 implementation uses a table look-up method, where the table has 32,768 9-bit elements and is addressed by indices with 9 and 6 bits. With these parameters, the total table size is 295 Kbits.

This disclosure describes techniques to enable efficient binary arithmetic coding using alternative indices for look-up tables (e.g., smaller indices resulting in smaller tables), or multiplications calculated by hardware (e.g., an ASIC) with a smaller number of bits for operands, resulting in better compression than that obtained with simple truncation. The techniques of this disclosure show that the bit precisions for probability and range used in the JEM-4.0 implementation are beyond what is needed. The techniques of this disclosure allow for nearly the same compression (0.00% average Bjøntegaard-Delta bit-rate loss on an all Intra coding sequence), using a table with two 4-bit indexes, and 1-byte sized elements. This represents a table with 256 8-bit elements, and a total size of 2 Kbits (the same size as tables in HEVC). As will be explained below, the same results as the new table look-up techniques can be alternatively obtained doing by performing standard multiplications of two 6-bit operands with hardware, where only 8 of the 12 operand bits are not identically 1.

Figure 4:
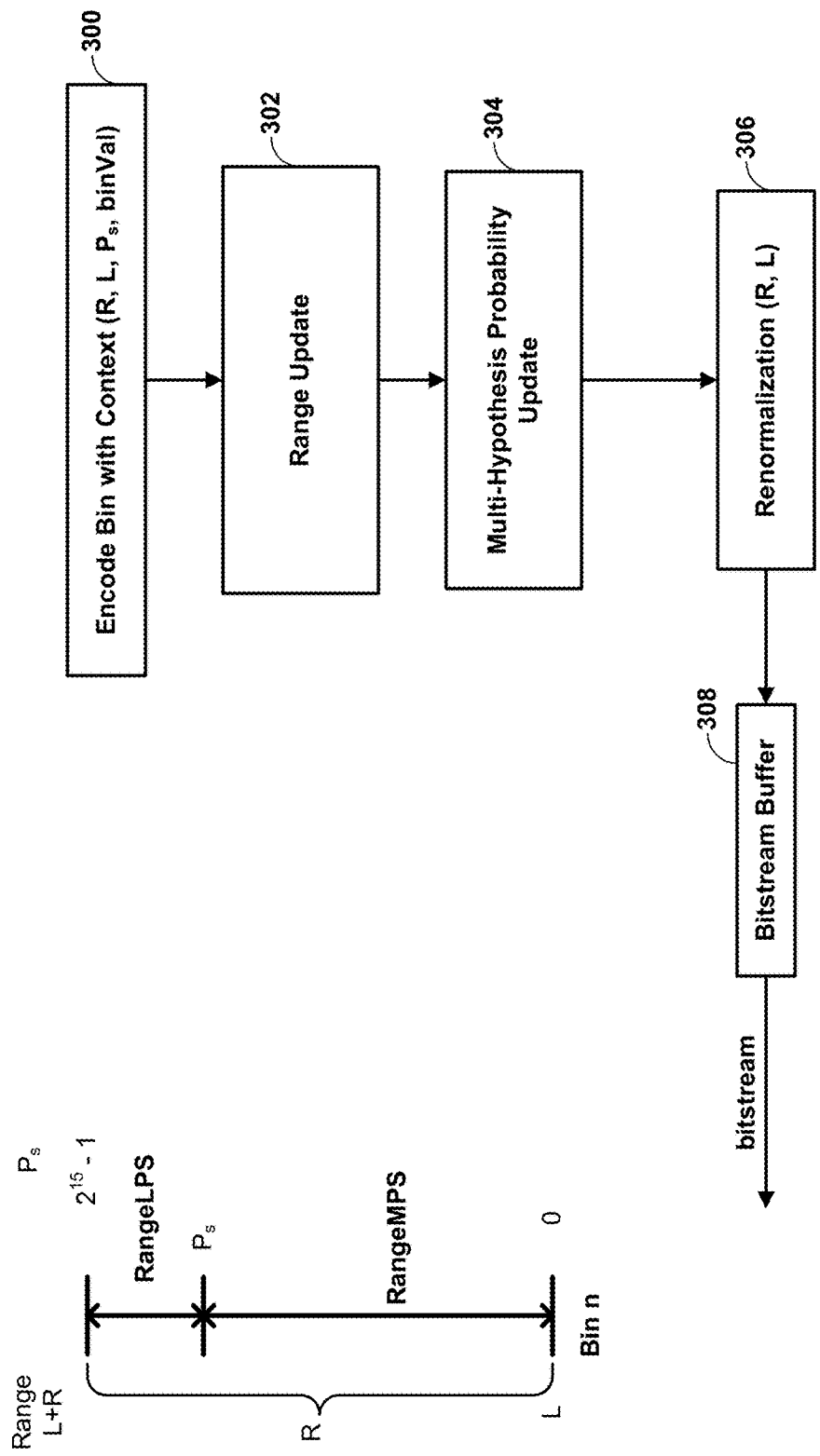
FIG. 4 is conceptual diagram showing an example arithmetic coder implementation.

FIG. 4 shows an example implementation of arithmetic coding in example JEM software. In this example, multiplications of the range and probability to compute the updated arithmetic coding interval (RangeLPS) are computed using a table called rTab[m][n], where m represents probability values, and n the arithmetic coding range.

In the example of FIG. 4, the probability (Ps) for a particular symbol can range from 0 to $2^{15}-1$. First, a bin of a syntax element is coded with a particular context, such as was described above to generate a bin value (binVal) (300). Next, the range for the least probable symbol and the most probable symbol are updated based on the table rTab[m][n] (302). As described above with reference to FIG. 2A and FIG. 2B, the value of the total range R and the low L may be updated based on the binVal having a value of 0 or 1. During the multi-hypothesis probability update (304), the probability values are updated based on the updated ranges. The total range R and low L are then renormalized (306). The output is then sent to bitstream buffer 308 for eventual output to the bitstream.

Figure 5:
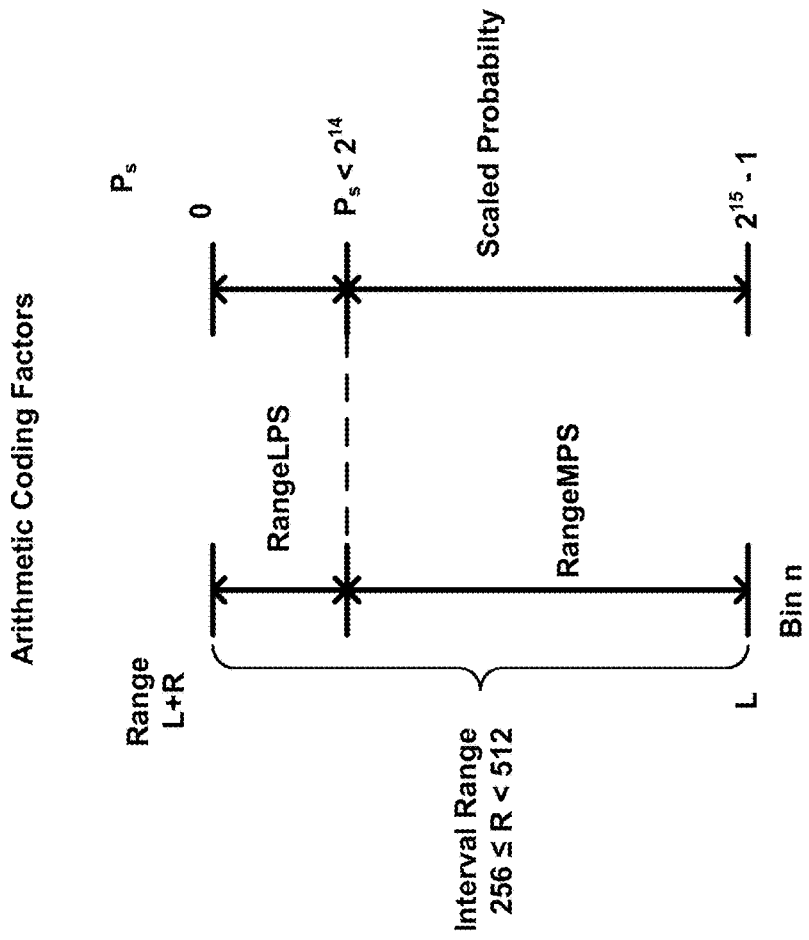
FIG. 5 is a conceptual diagram illustrating arithmetic coding factors according to one example of the disclosure.

FIG. 5 is a conceptual diagram illustrating the arithmetic coding factors used in the techniques of this disclosure. In particular, symbol probability $P_s$, interval range R, and the range of the least probable symbol (RangeLPS) are illustrated. As discussed above, JEM-4.0 uses a high precision (e.g., 15 bits) for representing the symbol probability. In this example, $P_s$ may be in the range of 0 to $2^{15}-1$. P, with a value between $0<P\leq 2^{14}$, is used to represent the integer with a scaled version of the estimated least-probable symbol (LPS) probability. The example of JEM-4.0 does not keep track of LPS and MPS. However, to simplify the description, assume that P is replaced with $2^{15}-1-P$, whenever $P \geq 2^{14}$.

The interval range (an integer value) is represented by symbol R, which may be divided into integers $R_L$ (RangeLPS) and $R_M$ (RangeMPS) such that $R_L \approx [R \times P/2^{15}]$ and $R_L + R_M = R$. In JEM-4.0 the interval range may be between 256 and 512.

The table look-up method used in JEM-4.0 has the form $$R_L = T[a(P), b(R)],$$

where $$a(P) = P>>6, b(R) = (R>>2) \& 63,$$

and the operators >> and & represent binary right-shifts, and binary AND, respectively.

In JEM-4.0, the indexes a(P) and b(R) are 11 and 6 bits, respectively, while entries in table T[a, b] are up to 9 bits. One problem with the table computation used in JEM-4.0 is that it does not compensate for the data lost due to truncations.

In other JEM implementations, 9 bits are used to represent m, 7 bits are used to represent n, and 9 bits are used to represent the table entries. This means that video encoder 20 and video decoder 30 would use at least 512×64×9 bits=295 Kbits of storage (for the look-up table). The 295 Kbits used to represent the look-up table are much more than what was required by the CABAC arithmetic codec used in AVC/H.264 and HEVC/H.265, and thus may greatly increase the cost of hardware implementations. As an alternative to look-up tables, some JEM techniques involve video encoder 20 and video decoder 30 performing the multiplications directly using hardware. However, implementing multiplications with operators that have 9 and 7 bits may also be too expensive and time consuming.

This disclosure describes techniques that may obtain nearly the same compression as BAC techniques that use the large table sizes described above, but with fewer bits used for multiplication operands and/or smaller look-up tables. As will be described below, the techniques of this disclosure may result in a look-up table size with a total of 16×16×8 bits=2048 bits, and/or multiplications that use 6 bits×6 bits, with special operands. It is possible to greatly reduce the look-up table size by adding offsets to the table products to compensate for the truncations, and scaling the probability for increased precision.

In one example of the disclosure, let R and $P_s$ be scaled values of the arithmetic coding range and symbol probability, respectively. Video encoder 20 and video decoder 30 may be configured to store a look-up table that may be used to determine the product of R and $P_s$. The look-up table sTab may be defined by:

$$sTab[m][n] = ((33+2*m)*(33+2*n))>>4$$

where >> represents a bitwise right shift (e.g., >>4 represents a right shift of 4 bits).

The indices of the tables are computed as $$m = (P_s>>(z-4)) \& 15, n = (R>>4) \& 15$$

where $$z = \text{floor}(\log_2(P_s))$$

The probability Ps is normalized by right bit shifts. The number of right bit shifts (e.g., (z−4)) is determined by the scaled probability value z. The floor function is a function that takes a real number as an input and gives an output that is the greatest integer that is less than or equal to the input. The indices m and n may be computed efficiently using table look-up, specialized hardware or "bit-scan-reverse" assembler instructions. For a given binary word, a bit-scan-reverse assembler instruction returns the most significant position (counting from zero) that is set to bit 1. For example, for octal word 0001011, a bit-scan-reverse assembler instruction returns position 3, for word 01001101, a bit-scan-reverse assembler instruction returns 6, for 00000011, a bit-scan-reverse assembler instruction returns 1, and for 0000001, a bit-scan-reverse assembler instruction returns 0.

In one example of the disclosure, the indices m and n are 4 bits each. In this example, the output values of look-up table sTab are 1 byte-sized elements. The total size of table sTab is 2 Kbits (e.g., 2048 bits)

Next, video encoder 20 and video decoder 30 may compute the value for updating the arithmetic coding interval (RangeLPS or $R_{LPS}$) with a bit shift of the look-up table value for given indices m and n:

$$R_{LPS} = sTab[m][n] >> (13-z)$$

In this example, $z \leq 13$ because $P < 2^{14}$. If the probability P has been replaced by $2^{15}-1-P$ to guarantee this condition, then the following can be used to compute the range of the most probable symbol (RangeMPS or $R_{MPS}$):

$$R_{MPS} = R_{MPS} - (sTab[m][n]>>(13-z)).$$

In another example of the disclosure, rather than using the look-up table sTab, video encoder 20 and video decoder 30 may be configured to directly multiply the probability (e.g., index m) and range (e.g., index n) values together using hardware, with some modifications. In particular, video encoder 20 and video decoder 30 may be configured to perform 6-bit×6-bit multiplications, and perform a bit shift on the 12-bit result to make the result for RangeLPS be a single byte (8 bits).

Figure 6:
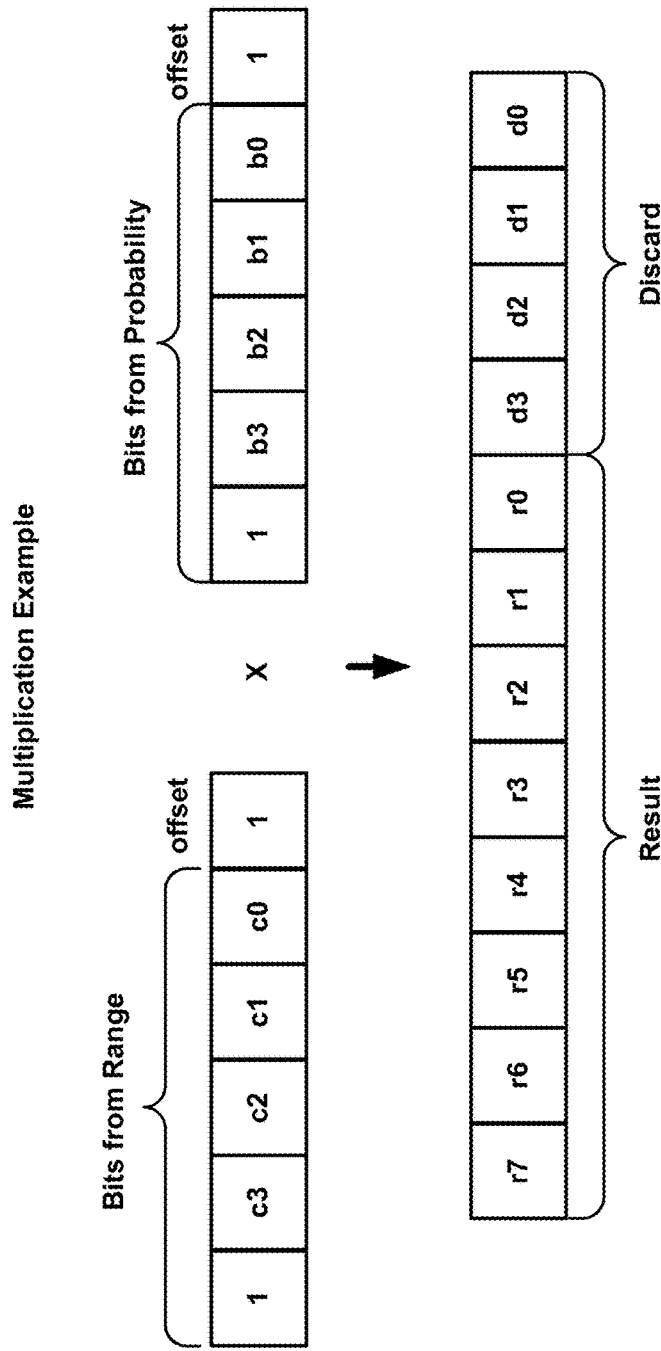
FIG. 6 is a conceptual diagram illustrating a multiplication example of the disclosure.

FIG. 6 is a conceptual diagram illustrating a multiplication example of the disclosure. The values of m and n may be computed and/or determined as described above. For example, we may define indexes m and n as having binary representations $\{b_3,b_2,b_1,b_0\}2$, and $\{c_3,c_2,c_1,c_0\}2$, respectively, where $b_n$ and $c_n$ represent the binary value of the n-th bit. Video encoder 20 and video decoder 30 may be configured to add a leading 1 value as the most significant bit of the range and probability values. Video encoder 20 and video decoder 30 may further be configured to add a value of 1 as an offset as the least significant bit of the range and probability values. In effect, adding a 1 value as an offset serves as the equivalent of adding ½ to the integer operands, and thus may be viewed as pre-rounding.

For the multiplication example of FIG. 6, 2 bits for each of the probability and the range operands always have the value of 1. That is, the most significant bit and the least significant bit (e.g., the offset) are always 1. As such, video encoder 20 and video decoder 30 may be configured to compute the values of sTab using the multiplication defined below:

$$sTab[m,n]=sTab[\{b_3,b_2,b_1,b_0\}_2,\{c_3,c_2,c_1,c_0\}_2]=(\{1,b_3,b_2,b_1,b_0,1\}_2\{1,c_3,c_2,c_1,c_0,1\}_2)>>4.$$

As shown in FIG. 6, multiplying the two 6-bit operands (range and probability) results in a 12-bit integer. As shown in the equation above, the multiplication is followed by a bitwise right shift of 4 bits. As such, only bits $r_7$-$r_0$ are kept (i.e., 8 bits). Video encoder 20 and video decoder 30 may discard bits $d_3$-$d_0$.

As such, in one example, video encoder 20 and video decoder 30 may be configured to compute the value of $R_{LPS}$ using look-up tables and bit shifts. In another example, video encoder 20 and video decoder 30 may be configured to compute $R_{LPS}$ using the product of two 6-bit integer operands, with the form described above, followed by bit shifts.

Testing has shown that the above techniques enable obtaining nearly the same performance as previous JEM BAC techniques (e.g., 0.00% average loss) using a table with 2 Kbits, or 6×6-bit hardware multiplications.

Figure 7A:
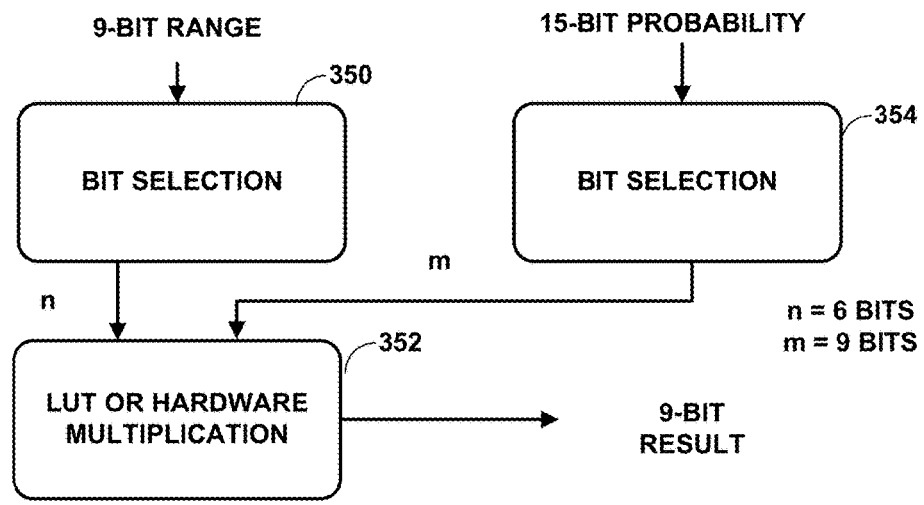
FIG. 7A is a conceptual diagram illustrating an example prior art process for determining a product of probability and range.
Figure 7B:
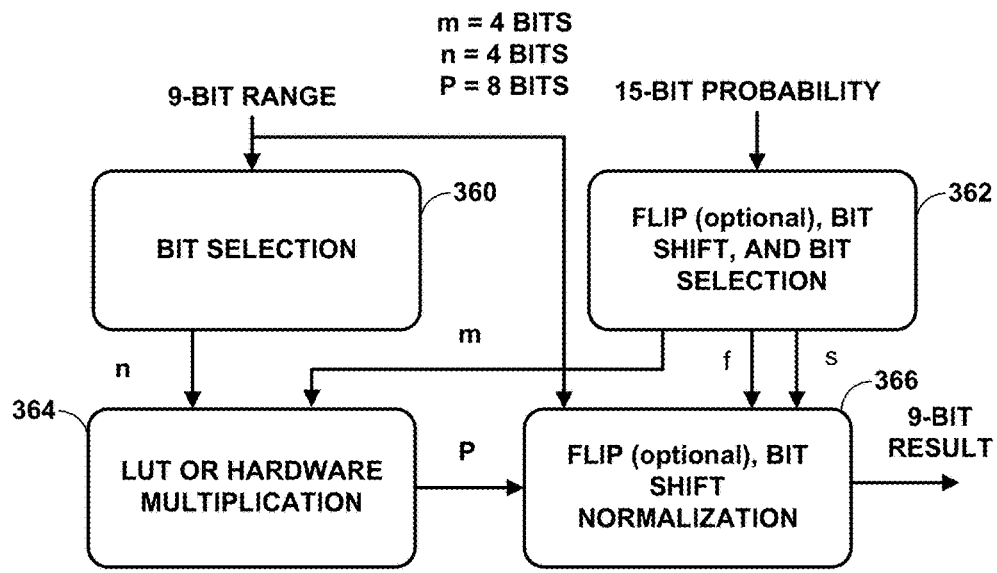
FIG. 7B is a conceptual diagram illustrating an example technique of this disclosure for determining a product of probability and range.

FIGS. 7A and 7B are conceptual diagrams that illustrate differences between example prior art techniques (FIG. 7A) for computing the product of the range (n) and probability (m) values and the example techniques of this disclosure (FIG. 7B).

As shown in FIG. 7A, bit selection process 350 may determine a 6-bit n value from an input 9-bit range value. In some examples, bit selection unit 350 may simply take the first 6 most significant bits of the 9-bit range value to determine the 6-bit value of n (i.e., truncation). In other examples, bit selection process 350 may round the 9-bit range value to obtain the 6-bit value of n. Similarly, bit selection unit 354 may determine a 9-bit m value from an input 15-bit probability value. In some examples, bit selection unit 354 may simply take the first 9 most significant bits of the 15-bit range value to determine the 9-bit value of m (i.e., truncation). In other examples, bit selection unit 354 may round the 15-bit range value to obtain the 9-bit value of m.

Product determination process 352 may use a LUT or hardware-based multiplication to determine the product of m and n. As described above, in this example, the LUT would include 64×512×9 bits to produce a 9-bit results. The hardware-based multiplication would involve a multiplication of a 6-bit n value and a 9-bit m value to obtain a 9-bit result. Rounding may be used to obtain the 9-bit result.

FIG. 7B is a conceptual diagram illustrating an example technique of this disclosure for determining a product of probability and range. As discussed above, the techniques of this disclosure use fewer bits for the values of m and n. For example, each of m and n may be represented with 4 bits. Bit selection process 360 may determine a 4-bit value of n from a 9-bit range value. As described above with respect to FIG. 6, when using hardware multiplication, video encoder 20 and video decoder 30 may be configured to add a leading 1 to the 4-bit n value (c3-c0 in FIG. 6), as well as an offset 1 at the end of the 4-bit n value. Bit selection process 362 may determine a 4-bit value of m from a 15-bit probability value. As described above with respect to FIG. 6, when using hardware multiplication, video encoder 20 and video decoder 30 may be configured to add a leading 1 to the 4-bit m value (b3-b0 in FIG. 6), as well as an offset 1 at the end of the 4-bit m value. Furthermore, bit selection process 362 may also perform a bit shift or the probability value, as described above. That is, $m=(P_s>>(z-4))$ & 15, where $z=floor(log_2(P_s))$.

Bit selection process 362 may also perform an optional flip process. The techniques described above are described with the assumption that video encoder 20 and video decoder 30 are updating a coding interval for an LPS. As such, the probability of the LPS is always less than 0.5, by definition. In other examples, video encoder 20 and video decoder 30 may be configured to update the coding interval for a symbol as a whole, or may determine a coding interval for an MPS. In such examples, the probability of the coded symbol may be greater than 0.5. When the probability is greater than 0.5, bit selection process 362 may be configured to "flip" the value of the probability (Ps) by computing the value of 1-Ps. As such, rather just multiplying the range by the probability, you would instead compute R−(1−Ps)×R where R is the range. If such a flip process in performed, bit selection process 36 may set a flag f=to true so that the flip process may be inverted to obtain the final result. Likewise, bit selection process 362 may indicate the number of shifted bits s so that the final result may be normalized.

Product determination process 364 may use a LUT or hardware-based multiplication to determine the product of m and n. As described above, in this example, the LUT would include 16×16×8 bits to produce a value P (sTab[m][n] in the examples above). In other examples, a hardware multiplication may be performed as described above with reference to FIG. 6. Normalization process 366 may perform the bit shift normalization, as described above. That is, video encoder 20 and video decoder 30 may compute the value for updating the arithmetic coding interval (RangeLPS or Rlps) with a bit shift of the look-up table value P for given indices m and n:

$$R_{LPS}=P>>(13-z)$$

If the probability P has been replaced by $2^{15}-1-P$ ("flip" condition), then the following is used to compute the range of the most probable symbol (RangeMPS or $R_{MPS}$): $R_{MPS}=R_{MPS}-(sTab[m][n]>>(13-z))$.

Figure 8:
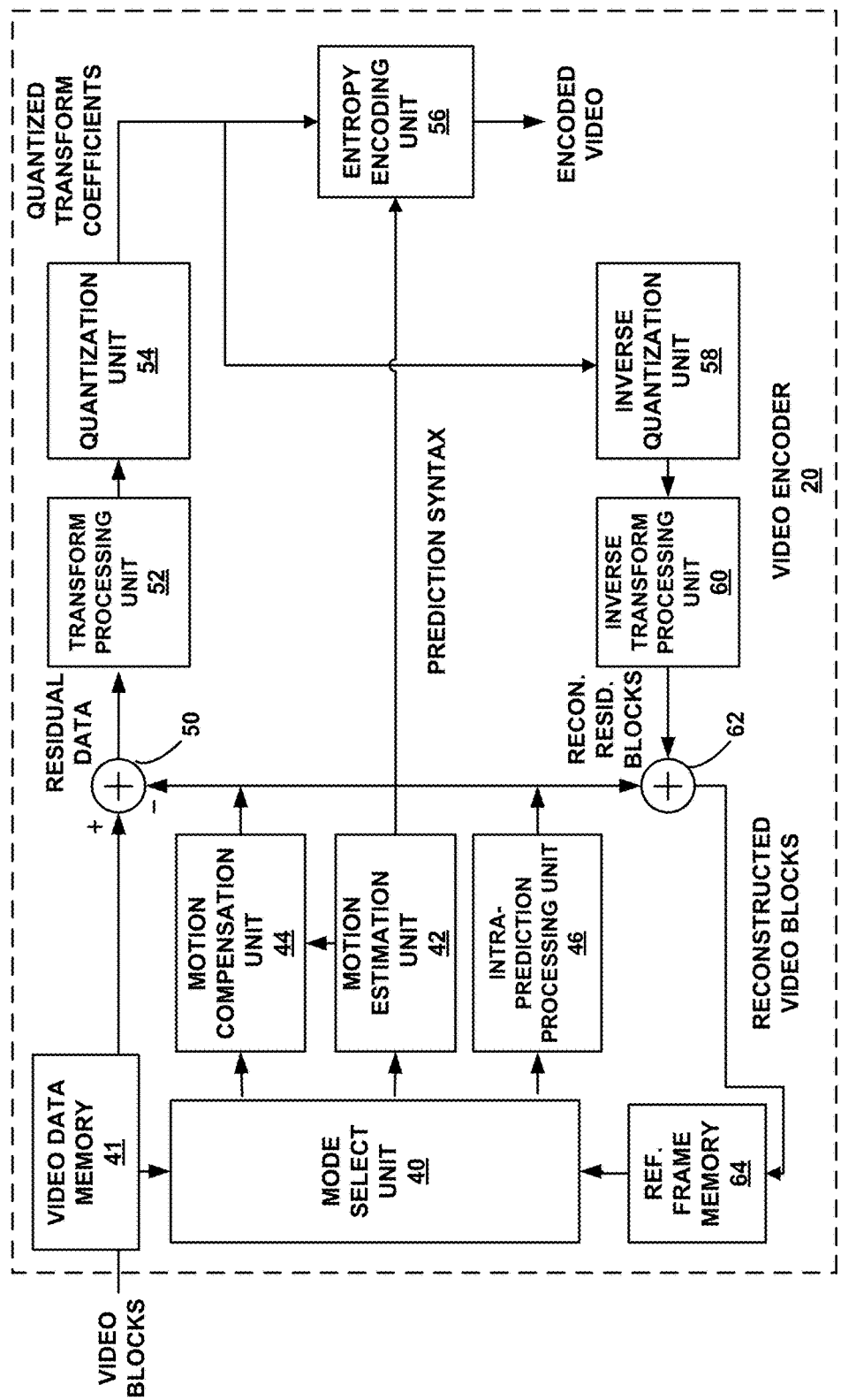
FIG. 8 is a block diagram illustrating an example video encoder.

FIG. 8 is a block diagram illustrating an example of video encoder 20 that may be configured to utilize techniques for BAC coding, as described in this disclosure. Video encoder 20 will be described in the context of HEVC coding for purposes of illustration, but without limitation of this disclosure as to other coding standards or methods. For example, video encoder 20 may operating according to future video coding standards, including H.266, which is currently under development. Video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 8, video encoder 20 receives a current video block within a video frame to be encoded. In the example of FIG. 8, video encoder 20 includes video data memory 41, mode select unit 40, motion compensation unit 44, motion estimation unit 42, intra-prediction processing unit 46, reference frame memory 64 (e.g., a decoded picture buffer), summer 50, transform processing unit 52, quantization unit 54, and entropy encoding unit 56. The transform processing unit 52 illustrated in FIG. 8 is the unit that applies the actual transform or combinations of transform to a block of residual data, and is not to be confused with block of transform coefficients, which also may be referred to as a transform unit (TU) of a CU. For video block reconstruction, the video encoder 20 also includes inverse quantization unit 58, inverse transform processing unit 60, and summer 62. A deblocking filter (not shown in FIG. 8) may also be included to filter block boundaries to remove blockiness artifacts from reconstructed video. If desired, the deblocking filter would typically filter the output of summer 62.

Video data memory 41 may be configured to store video data to be encoded by the components of video encoder 20. The video data stored in video data memory 41 may be obtained, for example, from video source 18. Reference frame memory 64 may be a reference picture memory (decoded picture buffer) that stores reference video data for use in encoding video data by video encoder 20, e.g., in intra- or inter-coding modes. Video data memory 41 and reference frame memory 64 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 41 and reference frame memory 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks, e.g., largest coding units (LCUs). Motion estimation unit 42 and the motion compensation unit 44 perform inter-predictive coding of the received video block relative to one or more blocks in one or more reference frames to provide temporal compression. Intra-prediction processing unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error (i.e., distortion) results for each mode, and provides the resulting intra- or inter-predicted block (e.g., a prediction unit (PU)) to summer 50 to generate residual block data and to the summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, intra-prediction processing unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. Motion estimation unit 42 calculates a motion vector for a prediction unit of an inter-coded frame by comparing the prediction unit to reference samples of a reference frame stored in reference frame memory 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

Motion estimation unit 42 sends the calculated motion vector and other syntax elements to entropy encoding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction processing unit 46 may perform intra-prediction on the received block, as an alternative to inter-prediction performed by motion estimation unit 42 and motion compensation unit 44. Intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. Intra-prediction processing unit 46 may be configured with a variety of different intra-prediction modes. For example, intra-prediction processing unit 46 may be configured with a certain number of directional prediction modes, e.g., thirty-five directional prediction modes, based on the size of the CU being encoded.

Intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction processing unit 46 may calculate an error value for the prediction mode based on pixel differences between the PU and the received block to be encoded. Intra-prediction processing unit 46 may continue testing intra-prediction modes until an intra-prediction mode that yields an acceptable error value is discovered. Intra-prediction processing unit 46 may then send the PU to summer 50.

Video encoder 20 forms a residual block by subtracting the prediction data calculated by motion compensation unit 44 or intra-prediction processing unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform processing unit 52 may form one or more transform units (TUs) from the residual block. Transform processing unit 52 selects a transform from among a plurality of transforms. The transform may be selected based on one or more coding characteristics, such as block size, coding mode, or the like. Transform processing unit 52 then applies the selected transform to the TU, producing a video block comprising a two-dimensional array of transform coefficients. In addition, transform processing unit 52 may signal the selected transform partition in the encoded video bitstream.

Transform processing unit 52 may send the resulting transform coefficients to quantization unit 54. Quantization unit 54 may then quantize the transform coefficients. The quantization matrix may specify values that, with a quantization parameter, may be used to determine an amount of quantization to be applied to corresponding transform coefficients. Entropy encoding unit 56 may perform a scan of the quantized transform coefficients in the matrix according to a scanning mode. This disclosure describes entropy encoding unit 56 as performing the scan. However, it should be understood that, in other examples, other processing units, such as quantization unit 54, could perform the scan.

Once the transform coefficients are scanned into the one-dimensional array, entropy encoding unit 56 may apply entropy coding such as context-adaptive variable length coding (CAVLC), context-adaptive binary arithmetic coding (CABAC), probability interval partitioning entropy coding (PIPE), Golomb coding, Golomb-Rice coding, exponential Golomb coding, syntax-based context-adaptive binary arithmetic coding (SBAC), or another entropy coding methodology to the coefficients. Although reference is made to a variety of different entropy coding processes, in accordance with examples of this disclosure, entropy encoding unit 56 may be configured to perform the BAC techniques described above.

To perform CABAC, entropy encoding unit 56 may select a context model to apply to a certain context to encode symbols to be transmitted. The context may relate to, for example, whether neighboring values are non-zero or not. Entropy encoding unit 56 may also entropy encode syntax elements, such as the signal representative of the selected transform. Following the entropy coding by entropy encoding unit 56, the resulting encoded video may be transmitted to another device, such as the video decoder 30, or archived for later transmission or retrieval.

Figure 9:
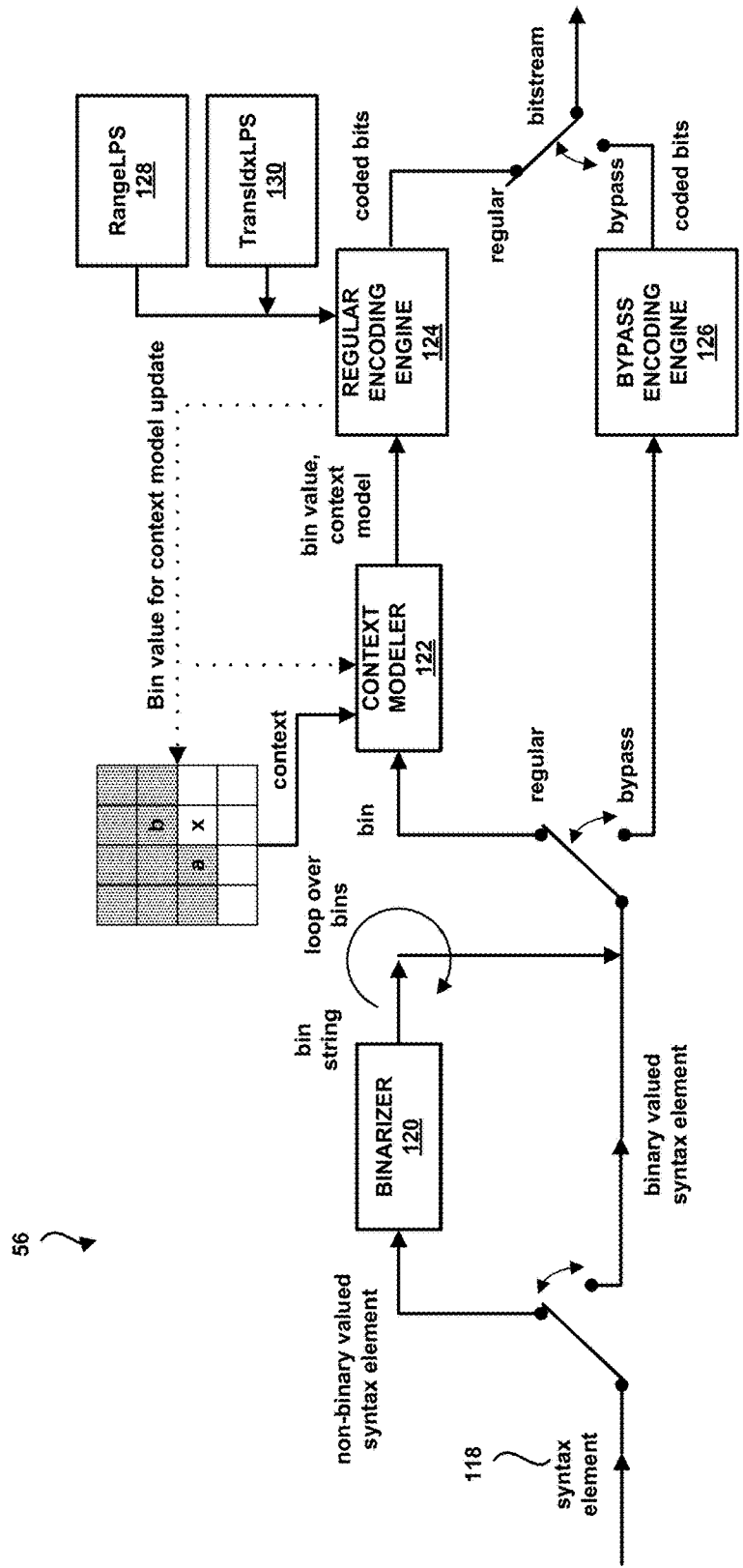
FIG. 9 is a block diagram illustrating a context adaptive binary arithmetic coder in a video encoder.

FIG. 9 is a block diagram of an example entropy encoding unit 56 that may be configured to perform CABAC in accordance with the techniques of this disclosure. A syntax element 118 is input into entropy encoding unit 56. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 120. Binarizer 120 performs a mapping of the non-binary valued syntax element into a sequence of binary decisions. These binary decisions are often called "bins." For example, for transform coefficient levels, the value of the level may be broken down into successive bins, each bin indicating whether or not the absolute value of a coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 120 is fed to the binary arithmetic coding side of entropy coding unit 56. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 126 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 122. Context modeler 122 outputs the bin value and the context model (e.g., the probability state $\sigma$). The context model may be an initial context model for a series of bins, or may be determined based on the coded values of previously coded bins. As described above, the context modeler may update the state based on whether or not the previously-coded bin was an MPS or an LPS. After the context model and probability state $\sigma$ is determined by context modeler 122, regular coding engine 124 performs BAC on the bin value using the techniques of this disclosure described above.

After the context model and probability state is determined by context modeler 122, regular coding engine 124 performs BAC on the bin value. According to some example techniques of this disclosure, regular coding engine 124 performs BAC using TransIdxLPS table 130 that includes probability states. TransIdxLPS is used to determine which probability state is used for a next bin (bin n+1) when the previous bin (bin n) is an LPS. Regular coding engine 124 may also use a RangeLPS table 128 to determine the range value for an LPS given a particular probability state. As described above, and as generally discussed in FIG. 7B, regular coding engine 124 may determine the product of the probability and range. For example, regular decoding engine 224 may determine the product of the probability and range using LUT sTAb, as described above. In other examples, regular decoding engine may determine the product of the probability and range using the hardware multiplication techniques described above with reference to FIG. 6.

Returning to FIG. 8, in some cases, entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients. In addition, entropy encoding unit 56, or other processing units, also may code other data, such as the values of a quantization matrix.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 10:
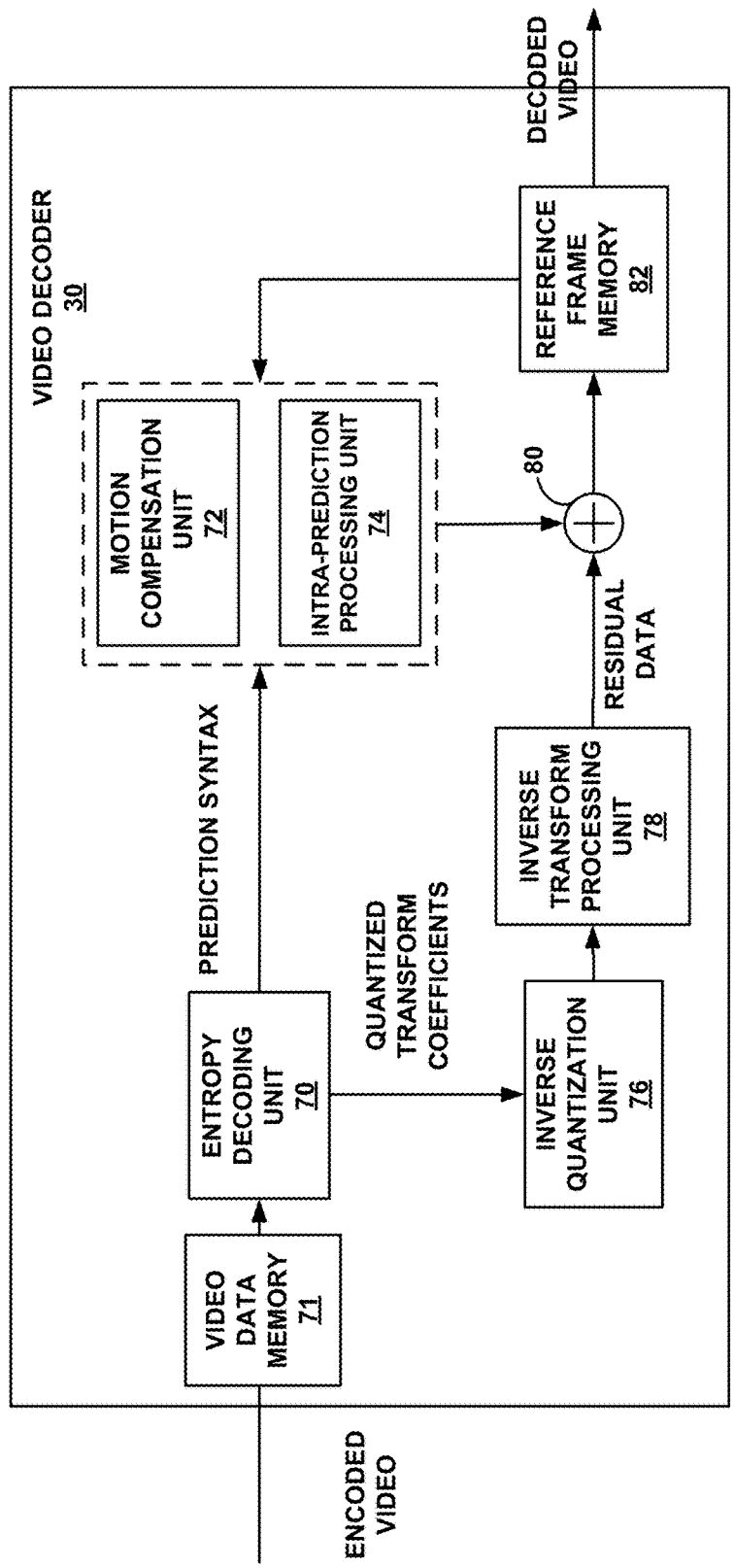
FIG. 10 is a block diagram illustrating an example video decoder.

FIG. 10 is a block diagram illustrating an example of a video decoder 30, which decodes an encoded video sequence. In the example of FIG. 10, the video decoder 30 includes video data memory 71, entropy decoding unit 70, motion compensation unit 72, intra-prediction processing unit 74, inverse quantization unit 76, inverse transformation unit 78, reference frame memory 82 (e.g., a decoded picture buffer) and summer 80. Video decoder 30 may, in some examples, perform a decoding pass generally reciprocal to the encoding pass described with respect to video encoder 20 (see FIG. 8).

Video data memory 71 may be configured to store video data to be decoded by the components of video decoder 30. The video data stored in video data memory 71 may be obtained, for example, from video encoder 20. Reference frame memory 82 may be a reference picture memory (decoded picture buffer) that stores reference video data for use in decoding video data by video decoder 30, e.g., in intra- or inter-coding modes. Video data memory 71 and reference frame memory 82 may be formed by any of a variety of memory devices, such as DRAM, including SDRAM, MRAM, RRAM, or other types of memory devices. Video data memory 71 and reference frame memory 82 may be provided by the same memory device or separate memory devices. In various examples, video data memory 71 may be on-chip with other components of video decoder 30, or off-chip relative to those components.

Entropy decoding unit 70 or another coding unit may be configured to use an inverse of the modified mapping described above, e.g., for quantization matrix values or other values, such as video data, using a modified mapping of source symbols. In particular, entropy decoding unit 70 may apply a process that is generally inverse to the process used by the encoder. Entropy decoding unit 70 performs an entropy decoding process on the encoded bitstream to retrieve a one-dimensional array of transform coefficients. Entropy decoding process used depends on the entropy coding used by the video encoder 20 (e.g., CABAC, PIPE, or other processes described above). In accordance with the techniques described in this disclosure, entropy decoding unit 70 may apply a BAC process, e.g., within a CABAC process, as described in this disclosure. The entropy coding process used by the encoder may be signaled in the encoded bitstream or may be a predetermined process.

Figure 11:
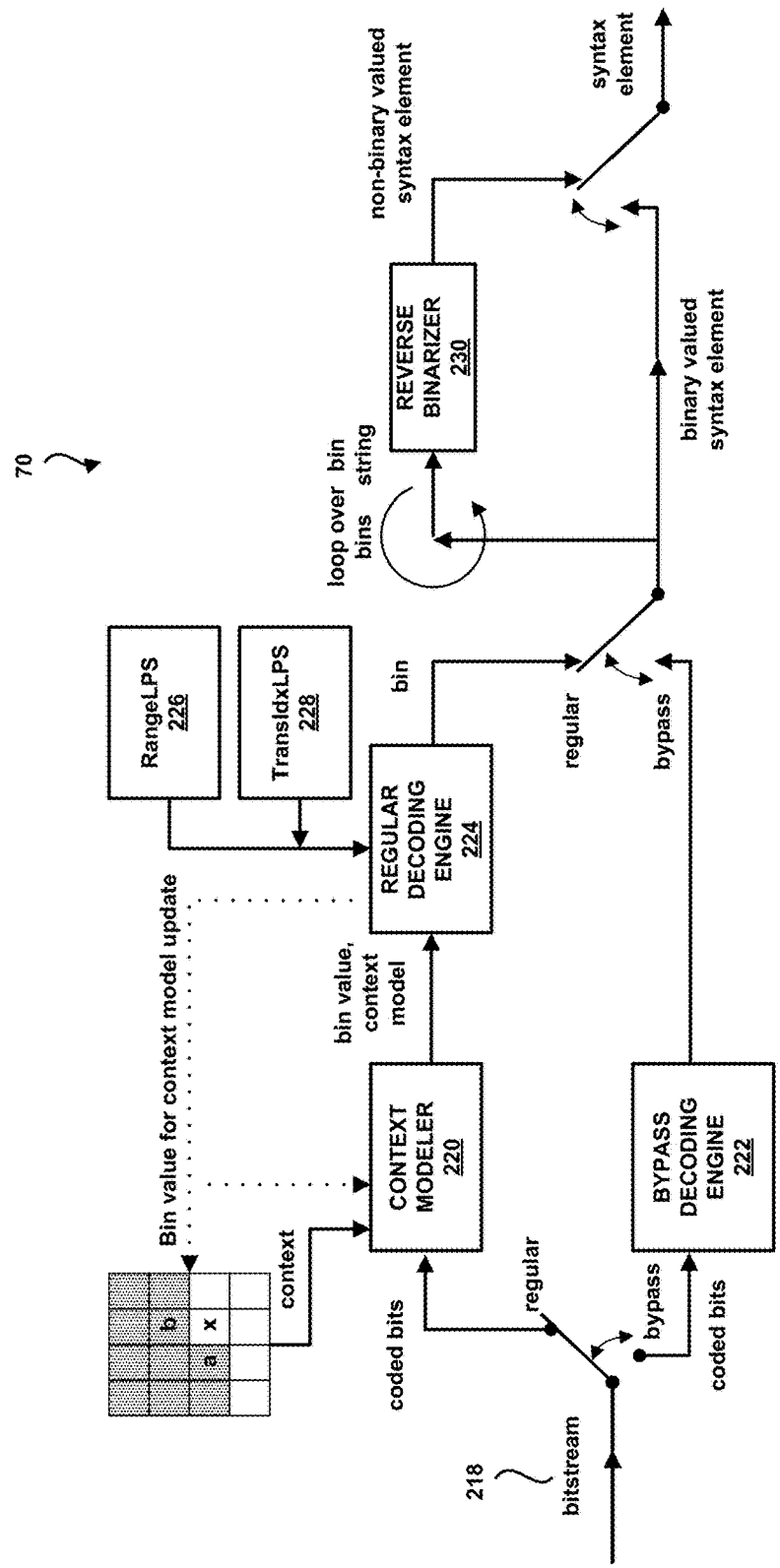
FIG. 11 is a block diagram illustrating a context adaptive binary arithmetic coder in a video decoder.

FIG. 11 is a block diagram of an example entropy encoding unit 70 that may be configured to perform CABAC in accordance with the techniques of this disclosure. Entropy decoding unit 70 of FIG. 11 performs CABAC in manner inverse to that of entropy encoding unit 56 described in FIG. 9. Coded bits from bitstream 218 are input into entropy decoding unit 70. The coded bits are fed to either context modeler 220 or bypass coding engine 222 based on whether or not they were entropy coded using bypass mode or regular mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 220 may determine a probability model for the coded bits and regular decoding engine 224 may decode the coded bits to produce bins of non-binary valued syntax elements (or the syntax elements themselves if binary-valued). After the context model and probability state σ is determined by context modeler 220, regular decoding engine 224 performs BAC on the bin value.

After the context model and probability state is determined by context modeler 220, regular decoding engine 224 performs BAC on the bin value. According to some example techniques of this disclosure, regular decoding engine 224 performs BAC using TransIdxLPS table 228 that includes probability states. TransIdxLPS is used to determine which probability state is used for a next bin (bin n+1) when the previous bin (bin n) is an LPS. Regular decoding engine 224 may also use a RangeLPS table 226 to determine the range value for an LPS given a particular probability state. As described above, and as generally discussed in FIG. 7B, regular decoding engine 224 may determine the product of the probability and range using the techniques of the disclosure. For example, regular decoding engine 224 may determine the product of the probability and range using LUT sTAb, as described above. In other examples, regular decoding engine may determine the product of the probability and range using the hardware multiplication techniques described above with reference to FIG. 6.

After the bins are decoded by regular decoding engine 224, a reverse binarizer 230 may perform a reverse mapping to convert the bins back into the values of the non-binary valued syntax elements. As shown in FIG. 11, the BAC process may be performed for all bins of a syntax elements (e.g., as indicated by the loop over bins, to produce a bin string prior to reverse binarization by reverse binarizer 230.

Returning to FIG. 10, in some examples, entropy decoding unit 70 (or inverse quantization unit 76) may scan the received values using a scan mirroring the scanning mode used by entropy encoding unit 56 (or quantization unit 54) of video encoder 20. Although the scanning of coefficients may be performed in inverse quantization unit 76, scanning will be described for purposes of illustration as being performed by entropy decoding unit 70. In addition, although shown as separate functional units for ease of illustration, the structure and functionality of entropy decoding unit 70, inverse quantization unit 76, and other units of video decoder 30 may be highly integrated with one another.

Inverse quantization unit 76 inverse quantizes, i.e., de-quantizes, the quantized transform coefficients provided in the bitstream and decoded by entropy decoding unit 70. The inverse quantization process may include a conventional process, e.g., similar to the processes proposed for HEVC or defined by the H.264 decoding standard. The inverse quantization process may include use of a quantization parameter QP calculated by video encoder 20 for the CU to determine a degree of quantization and, likewise, a degree of inverse quantization that should be applied. Inverse quantization unit 76 may inverse quantize the transform coefficients either before or after the coefficients are converted from a one-dimensional array to a two-dimensional array.

Inverse transform processing unit 78 applies an inverse transform to the inverse quantized transform coefficients. In some examples, inverse transform processing unit 78 may determine an inverse transform based on signaling from video encoder 20, or by inferring the transform from one or more coding characteristics such as block size, coding mode, or the like. In some examples, inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded.

In addition, inverse transform processing unit may apply the inverse transform to produce a transform unit partition in accordance with the above-described techniques of this disclosure.

Intra-prediction processing unit 74 may generate prediction data for a current block of a current frame based on a signaled intra-prediction mode and data from previously decoded blocks of the current frame.

Based on the retrieved motion prediction direction, reference frame index, and calculated current motion vector (e.g., a motion vector copied from a neighboring block according to a merge mode), motion compensation unit 72 produces a motion compensated block for the current portion. These motion compensated blocks essentially recreate the predictive block used to produce the residual data.

Motion compensation unit 72 may produce the motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction processing unit 74, in an HEVC example, may use some of the syntax information (e.g., provided by a quadtree) to determine sizes of LCUs used to encode frame(s) of the encoded video sequence. Motion compensation unit 72 and intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction processing unit 74 to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as the display device 32 of FIG. 1).

Figure 12:
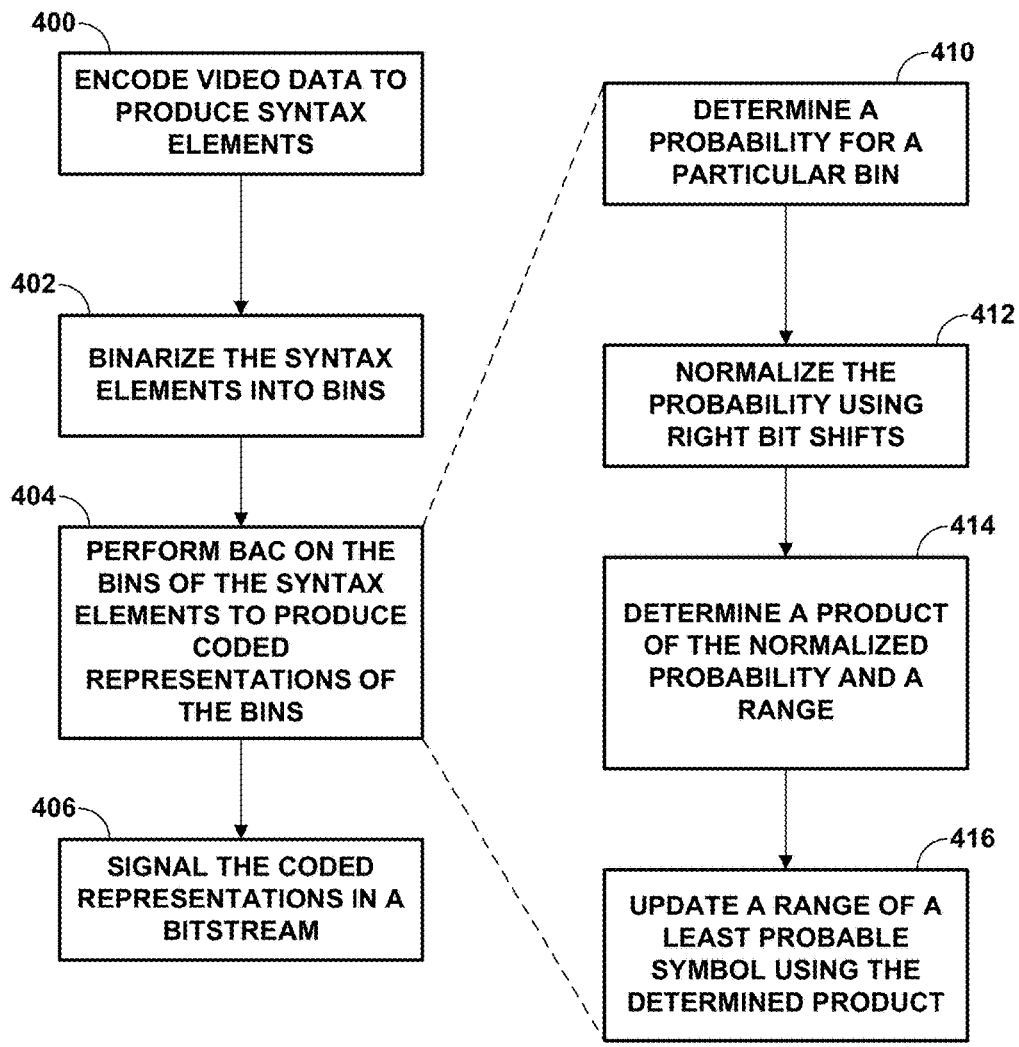
FIG. 12 is a flowchart illustrating an example encoding method of the disclosure.

FIG. 12 is a flowchart illustrating an example encoding method of the disclosure. The techniques of FIG. 12 may be performed by video encoder 20, including entropy encoding unit 56.

In one example of the disclosure, video encoder 20 may be configured to encode video data to produce syntax elements (400), binarize the syntax elements into bins (402), perform binary arithmetic coding on the bins of the syntax elements to produce coded representations of the bins (404), and signal the coded representations in a bitstream (406). To perform the binary arithmetic coding, video encoder 20 may be further configured to determine a probability for a particular bin of a particular syntax element of the syntax elements (410), normalize the probability for the particular bin using right bit shifts to create a normalized probability (412), determine a product of the normalized probability and a range for the particular bin (414), and update a range of a least probable symbol for the particular bin using the determined product (416). It should be understood that techniques 410-416 are an expansion on BAC process 404.

It should be understood that it is not required for video encoder 20 to perform binary arithmetic coding on all syntax elements that are encoded. As discussed above, some syntax elements may be encoded using a fixed-length code, encoded using a bypass mode of a CABAC encoder, or encoded in another manner.

In another example of the disclosure, video encoder 20 may be configured to scale the probability using the integer function z=floor(log 2(P)), where z is the scaled probability and P is the probability. To normalize the probability, video encoder 20 may be further configured to normalize the probability using the function (P>>(z−4))&15), wherein >> is a bitwise right shift, and wherein & is a bitwise AND function.

In another example of the disclosure, video encoder 20, in order to determine the product of the normalized probability and the range, may be further configured to determine the product of the normalized probability and the range using the look-up table sTab having indices m and n, where sTab[m][n]=((33+2*m)*(33+2*n))>>4, where m=(P>>(z−4)) & 15, and n=(R>>4) & 15, and where R is the range. In one example, m and n are 4-bit indices, and the look-up table has a size of 2 Kbits.

In another example of the disclosure, video encoder 20, in order to update the range of the least probable symbol, may be further configured to update the range of the least probable symbol using the equation $R_{LPS}$=sTab[m][n]>>(13−z), where $R_{LPS}$ is the range of the least probable symbol.

In another example of the disclosure, video encoder 20, in order to perform the binary arithmetic coding, may be further configured to update a range of a most probable symbol using the equation $R_{MPS}$=$R_{-RLPS}$, where $R_{MPS}$ is the range of the most probable symbol.

In another example of the disclosure, video encoder 20, in order to determine the product of the normalized probability and the range, may be further configured to multiply the normalized probability and the range according to the equation $(\{1,b_3,b_2,b_1,1\}_2 \times \{1,c_3,c_2,c_1,c_0,1\}_2) \gg 4$, where $b_3, b_2, b_1, b_0$ represent the bits of the normalized probability and $c_3, c_2, c_1, c_0$ represent the bits of the range.

In one example of the disclosure, video encoder 20 may be part of an apparatus that further includes a camera configured to capture the video data. In another example of the disclosure, video encoder 20 may be part of an apparatus that is a wireless communication device further comprising a transmitter configured to transmit the bitstream. In another example of the disclosure, the wireless communication device is a cellular telephone and the video data is transmitted by the transmitter and modulated according to a cellular communication standard.

Figure 13:
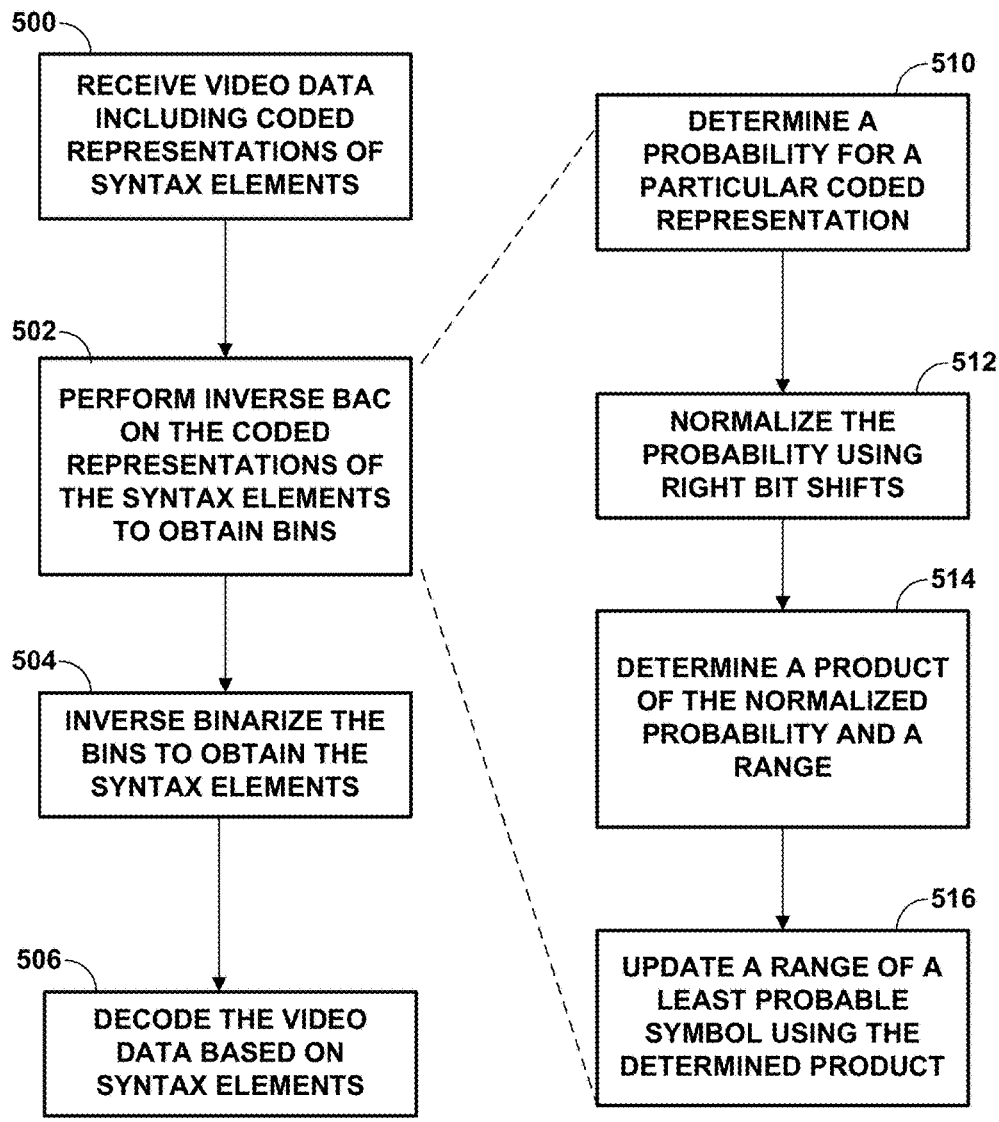
FIG. 13 is a flowchart illustrating an example encoding method of the disclosure.

FIG. 13 is a flowchart illustrating an example decoding method of the disclosure. The techniques of FIG. 13 may be performed by video decoder 30, including entropy decoding unit 70.

In one example of the disclosure, video decoder 30 may be configured to receive video data including coded representations of syntax elements (500), perform inverse binary arithmetic coding on the coded representations of the syntax elements to obtain bins of the syntax elements (502), inverse binarize the bins of the syntax elements to obtain the syntax elements (504), and decode the video data based on the syntax elements (506). To perform the inverse binary arithmetic coding, video decoder 30 may be further configured to determine a probability for a particular coded representation of the coded representations (510), normalize the probability for the particular coded representation using right bit shifts to create a normalized probability (512), determine a product of the normalized probability and a range for the particular coded representation (514), and update a range of a least probable symbol for the particular coded representation using the determined product (516). It should be understood that techniques 510-516 are an expansion on inverse BAC process 504.

It should be understood that it is not required for video decoder to perform binary arithmetic coding on all syntax elements. As discussed above, some syntax elements may be decoded using a fixed-length code, decoded using a bypass mode of a CABAC encoder, or decoded in another manner.

In one example of the disclosure, video decoder 30 may be further configured to scale the probability using the integer function $z = \text{floor}(\log 2(P))$, where z is the scaled probability and P is the probability, and, to normalize the probability, video decoder 30 may be further configured to normalize the probability using the function $(P \gg (z-4)) \& 15)$, wherein $\gg$ is a bitwise right shift, and wherein & is a bitwise AND function.

In another example disclosure, video decoder 30, in order to determine the product of the normalized probability and the range, may be further configured to determine the product of the normalized probability and the range using the look-up table sTab having indices m and n, where $\text{sTab}[m][n] = ((33+2*m)*(33+2*n)) \gg 4$, where $m = (P \gg (z-4)) \& 15$, and $n = (R \gg 4) \& 15$, and where R is the range. In one example, m and n are 4-bit indices, and the look-up table has a size of 2 Kbits.

In another example disclosure, video decoder 30, in order to update the range of the least probable symbol, may be further configured to update the range of the least probable symbol using the equation $R_{LPS} = \text{sTab}[m][n] \gg (13-z)$, where $R_{LPS}$ is the range of the least probable symbol.

In another example disclosure, video decoder 30, in order to perform the inverse binary arithmetic coding, may be further configured to update a range of a most probable symbol using the equation $R_{MPS} = R - R_{LPS}$, where $R_{MPS}$ is the range of the most probable symbol.

In another example disclosure, video decoder 30, in order to determine the product of the normalized probability and the range, may be further configured to multiply the normalized probability and the range according to the equation $(\{1,b_3,b_2,b_1,b_0,1\}_2 \times \{1,c_3,c_2,c_1,c_0,1\}_2) \gg 4$, where $b_3, b_2, b_1, b_0$ represent the bits of the normalized probability and $c_3, c_2, c_1, c_0$ represent the bits of the range.

In one example of the disclosure, video decoder 30 may be part of an apparatus that further includes a display configured to display the decoded video data. In another example of the disclosure, video encoder 20 may be part of an apparatus that is a wireless communication device further comprising a receiver configured to receive the video data. In one example, the wireless communication device is a cellular telephone and the video data is received by the receiver and demodulated according to a cellular communication standard.

In another example of the disclosure, the syntax elements include syntax elements indicating transform coefficients for a block of video data. In this example, video decoder 30 may further be configured to determine a context that includes the probability for the particular coded representation, inverse quantize the transform coefficients, inverse transform the inverse quantized transform coefficients to produce residual data, perform a prediction process (e.g., intra prediction or inter prediction) on the residual data to produce a decoded block of video data, and output the decoded block of video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving video data including coded representations of syntax elements;
   performing inverse binary arithmetic coding on the coded representations of the syntax elements to obtain bins of the syntax elements, performing the inverse binary arithmetic coding including:
      determining a probability for a particular coded representation of the coded representations;
      scaling the probability using an integer function $z=\text{floor}(\log 2(P))$, where z is the scaled probability and P is the probability;
      normalizing the scaled probability for the particular coded representation using right bit shifts to create a normalized probability, wherein normalizing the probability comprises normalizing the probability using a function $(P>>(z-4))\&15$, wherein $>>$ is a bitwise right shift, and wherein & is a bitwise AND function;
      determining a product of the normalized probability and a range for the particular coded representation; and
      updating a range of a least probable symbol for the particular coded representation using the determined product;
   inverse binarizing the bins of the syntax elements to obtain the syntax elements; and
   decoding the video data based on the syntax elements.

2. The method of claim 1, wherein the particular coded representation is a value indicating an interval value a probability within a final coded probability interval.

3. The method of claim 1, wherein determining the product of the normalized probability and the range comprises:
   determining the product of the normalized probability and the range using the look-up table sTab having indices m and n, where $s\text{Tab}[m][n]=((33+2*m)*(33+2*n))>>4$, where $m=(P>>(z-4))\ \&\ 15$, and $n=(R>>4)\ \&\ 15$, and where R is the range.

4. The method of claim 3, wherein m and n are 4-bit indices, and wherein the look-up table has a size of 2 Kbits.

5. The method of claim 3, wherein updating the range of the least probable symbol comprises:
   updating the range of the least probable symbol using the equation $R_{LPS}=s\text{Tab}[m][n]>>(13-z)$, where $R_{LPS}$ is the range of the least probable symbol.

6. The method of claim 5, wherein performing the inverse binary arithmetic coding further includes:
   updating a range of a most probable symbol using the equation $R_{MPS}=R_{-RLPS}$, where $R_{MPS}$ is the range of the most probable symbol.

7. The method of claim 1, wherein determining the product of the normalized probability and the range comprises:
   multiplying the normalized probability and the range according to the equation $(\{1,b_3,b_2,b_1,b_0,1\}_2 \times \{1,c_3,c_2,c_1,c_0,1\}_2)>>4$, where $b_3,b_2,b_1,b_0$ represent the bits of the normalized probability and $c_3,c_2,c_1,c_0$ represent the bits of the range.

8. The method of claim 1, wherein the syntax elements include syntax elements indicating transform coefficients for a block of video data, the method further comprising:
   determining a context that includes the probability for the particular coded representation;
   inverse quantizing the transform coefficients;
   inverse transforming the inverse quantized transform coefficients to produce residual data;
   performing a prediction process on the residual data to produce a decoded block of video data; and
   outputting the decoded block of video data.

9. An apparatus configured to decode video data, the apparatus comprising:
   a memory configured to store the video data; and
   one or more processors in communication with the memory, the one or more processors configured to:
      receive the video data including coded representations of syntax elements;
      perform inverse binary arithmetic coding on the coded representations of the syntax elements to obtain bins of the syntax elements, wherein to perform the inverse binary arithmetic coding, the one or more processors are further configured to:
         determine a probability for a particular coded representation of the coded representations;
         scale the probability using an integer function $z=\text{floor}(\log 2(P))$, where z is the scaled probability and P is the probability;
         normalize the scaled probability for the particular coded representation using right bit shifts to create a normalized probability, wherein to normalize the probability, the one or more processors are further configured to normalize the probability using a function (P>>(z−4))&15), wherein >> is a bitwise right shift, and wherein & is a bitwise AND function;

determine a product of the normalized probability and a range for the particular coded representation; and update a range of a least probable symbol for the particular coded representation using the determined product;

inverse binarize the bins of the syntax elements to obtain the syntax elements; and decode the video data based on the syntax elements.

10. The apparatus of claim 9, wherein the particular coded representation is a value indicating an interval value a probability within a final coded probability interval.

11. The apparatus of claim 9, wherein to determine the product of the normalized probability and the range, the one or more processors are further configured to:

determine the product of the normalized probability and the range using the look-up table sTab having indices m and n, where sTab[m][n]=((33+2*m)*(33+2*n))>>4, where m=(P>>(z−4)) & 15, and n=(R>>4) & 15, and where R is the range.

12. The apparatus of claim 11, wherein m and n are 4-bit indices, and wherein the look-up table has a size of 2 Kbits.

13. The apparatus of claim 11, wherein to update the range of the least probable symbol, the one or more processors are further configured to:

update the range of the least probable symbol using the equation $R_{LPS}$=sTab[m][n]>>(13−z), where $R_{LPS}$ is the range of the least probable symbol.

14. The apparatus of claim 13, wherein to perform the inverse binary arithmetic coding, the one or more processors are further configured to:

update a range of a most probable symbol using the equation $R_{MPS}$=$R_{-RLPS}$, where $R_{MPS}$ is the range of the most probable symbol.

15. The apparatus of claim 9, wherein to determine the product of the normalized probability and the range, the one or more processors are further configured to:

multiply the normalized probability and the range according to the equation $(\{1,b_3,b_2,b_1,b_0,1\}_2 \times \{1,c_3,c_2,c_1,c_0,1\}_2)$>>4, where $b_3,b_2,b_1,b_0$ represent the bits of the normalized probability and $c_3,c_2,c_1,c_0$ represent the bits of the range.

16. The apparatus of claim 9, further comprising:
a display configured to display the decoded video data.

17. The apparatus of claim 9, wherein the syntax elements include syntax elements indicating transform coefficients for a block of the video data, wherein the one or more processors are further configured to:

determine a context that includes the probability for the particular coded representation;

inverse quantize the transform coefficients;

inverse transform the inverse quantized transform coefficients to produce residual data;

perform a prediction process on the residual data to produce a decoded block of video data; and output the decoded block of the video data.

18. A non-transitory computer-readable storage medium storing instructions that, when executed, causes one or more processors of a device configured to decode video data to:

receive the video data including coded representations of syntax elements;

perform inverse binary arithmetic coding on the coded representations of the syntax elements to obtain bins of the syntax elements, wherein to perform the inverse binary arithmetic coding, the instructions cause the one or more processors to:

determine a probability for a particular coded representation of the coded representations;

scale the probability using an integer function z=floor (log 2(P)), where z is the scaled probability and P is the probability;

normalize the scaled probability for the particular coded representation using right bit shifts to create a normalized probability, wherein to normalize the probability, the instructions further cause the one or more processors to normalize the probability using a function (P>>(z−4))&15), wherein >> is a bitwise right shift, and wherein & is a bitwise AND function;

determine a product of the normalized probability and a range for the particular coded representation; and update a range of a least probable symbol for the particular coded representation using the determined product;

inverse binarize the bins of the syntax elements to obtain the syntax elements; and decode the video data based on the syntax elements.

19. An apparatus configured to encode video data, the apparatus comprising:

a memory configured to store the video data; and one or more processors in communication with the memory, the one or more processors configured to:

encode the video data to produce syntax elements;

binarize the syntax elements into bins;

perform binary arithmetic coding on the bins of the syntax elements to produced coded representations of the bins, wherein to perform the binary arithmetic coding, the one or more processors are further configured to:

determine a probability for a particular bin of a particular syntax element of the syntax elements;

scale the probability using an integer function z=floor(log 2(P)), where z is the scaled probability and P is the probability;

normalize the scaled probability for the particular bin using right bit shifts to create a normalized probability, wherein to normalize the probability, the one or more processors are further configured to normalize the probability using a function (P>>(z−4))&15), wherein >> is a bitwise right shift, and wherein & is a bitwise AND function;

determine a product of the normalized probability and a range for the particular bin; and update a range of a least probable symbol for the particular bin using the determined product; and signal the coded representations in a bitstream.

20. The apparatus of claim 19, wherein the coded representations are values indicating an interval value a probability within a final coded probability interval.

21. The apparatus of claim 19, wherein to determine the product of the normalized probability and the range, the one or more processors are further configured to:

determine the product of the normalized probability and the range using the look-up table sTab having indices m and n, where sTab[m][n]=((33+2*m)*(33+2*n))>>4, where m=(P>>(z−4)) & 15, and n=(R>>4) & 15, and where R is the range.

22. The apparatus of claim 21, wherein m and n are 4-bit indices, and wherein the look-up table has a size of 2 Kbits.

23. The apparatus of claim 21, wherein to update the range of the least probable symbol, the one or more processors are further configured to:
update the range of the least probable symbol using the equation $R_{LPS}=sTab[m][n]>>(13-z)$, where $R_{LPS}$ is the range of the least probable symbol.

24. The apparatus of claim 23, wherein to perform the binary arithmetic coding, the one or more processors are further configured to:
update a range of a most probable symbol using the equation $R_{MPS}=R_{-RLPS}$, where $R_{MPS}$ is the range of the most probable symbol.

25. The apparatus of claim 19, wherein to determine the product of the normalized probability and the range, the one or more processors are further configured to:
multiply the normalized probability and the range according to the equation $(\{1,b_3,b_2,b_1,b_0,1\}_2 \times \{1,c_3,c_2,c_1,c_0,1\}_2) >> 4$, where $b_3,b_2,b_1,b_0$ represent the bits of the normalized probability and $c_3,c_2,c_1,c_0$ represent the bits of the range.

26. The apparatus of claim 19, further comprising:
a camera configured to capture the video data.

27. The apparatus of claim 19, wherein the apparatus is a wireless communication device, further comprising:
a transmitter configured to transmit the bitstream.

* * * * *